United States Patent
Huo et al.

(10) Patent No.: US 11,509,901 B2
(45) Date of Patent: Nov. 22, 2022

(54) METHOD FOR COLOUR COMPONENT PREDICTION, ENCODER, DECODER AND STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Wei Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/197,327

(22) Filed: Mar. 10, 2021

(65) Prior Publication Data

US 2021/0203941 A1   Jul. 1, 2021

Related U.S. Application Data

(63) Continuation of application No. PCT/CN2020/090688, filed on May 15, 2020.

(Continued)

(51) Int. Cl.
    *H04N 19/132*   (2014.01)
    *H04N 19/159*   (2014.01)
    (Continued)

(52) U.S. Cl.
    CPC ............ *H04N 19/132* (2014.11); *G06F 5/01* (2013.01); *G06F 17/16* (2013.01); *H04N 19/159* (2014.11);
    (Continued)

(58) Field of Classification Search
    None
    See application file for complete search history.

(56) References Cited

U.S. PATENT DOCUMENTS

| 9,258,573 B2 | 2/2016 | Drugeon |
| 10,349,061 B2 | 7/2019 | King |

(Continued)

FOREIGN PATENT DOCUMENTS

| CN | 1741612 A | 3/2006 |
| CN | 102595112 A | 7/2012 |

(Continued)

OTHER PUBLICATIONS

A. Filippov and V. Rufitskiy, "Recent Advances in Intra Prediction for the Emerging H.266/VVC Video Coding Standard," 2019 International Multi-Conference on Engineering, Computer and Information Sciences (SIBIRCON), 2019, pp. 0525-0530, doi: 10.1109/SIBIRCON48586.2019.8958416.*

(Continued)

*Primary Examiner* — Mohammad J Rahman
(74) *Attorney, Agent, or Firm* — Bayes PLLC

(57) ABSTRACT

A method for colour component prediction, an encoder, a decoder and a storage medium are provided. The method includes that: prediction parameters of a current block are determined, the prediction parameters including a prediction mode parameter and a size parameter of the current block; when the prediction mode parameter indicates that a Matrix-based Intra Prediction (MIP) mode is adopted to determine an intra prediction value of the current block, an MIP weight matrix of the current block, a shift factor of the current block and an MIP input sample matrix of the current block are determined; and the intra prediction value of the current block is determined according to the MIP weight matrix, the shift factor and the MIP input sample matrix.

8 Claims, 5 Drawing Sheets

Related U.S. Application Data

(60) Provisional application No. 62/872,830, filed on Jul. 11, 2019, provisional application No. 62/873,170, filed on Jul. 11, 2019, provisional application No. 62/872,488, filed on Jul. 10, 2019.

(51) Int. Cl.
  H04N 19/176 (2014.01)
  H04N 19/186 (2014.01)
  G06F 5/01 (2006.01)
  G06F 17/16 (2006.01)

(52) U.S. Cl.
  CPC ......... *H04N 19/176* (2014.11); *H04N 19/186* (2014.11)

(56) References Cited

U.S. PATENT DOCUMENTS

| | | | |
|---|---|---|---|
| 10,674,162 | B2 | 6/2020 | King |
| 2011/0145549 | A1 | 6/2011 | Suk |
| 2012/0140821 | A1 | 6/2012 | Drugeon |
| 2014/0086318 | A1* | 3/2014 | Kerofsky ............ H04N 19/132 375/240.12 |
| 2014/0198848 | A1* | 7/2014 | Yie ..................... H04N 19/176 375/240.13 |
| 2014/0362926 | A1* | 12/2014 | Rosewarne ......... H04N 19/176 375/240.18 |
| 2017/0019678 | A1* | 1/2017 | Kim .................... H04N 19/186 |
| 2018/0020223 | A1 | 1/2018 | King |
| 2018/0176601 | A1* | 6/2018 | Jeong ................. H04N 19/176 |
| 2019/0246138 | A1* | 8/2019 | Terterov ............ H04N 5/23267 |
| 2019/0281307 | A1 | 9/2019 | King |
| 2019/0281308 | A1 | 9/2019 | King |
| 2020/0344468 | A1* | 10/2020 | Lin ..................... H04N 19/105 |
| 2020/0359050 | A1* | 11/2020 | Van der Auwera .... H04N 19/42 |
| 2020/0396455 | A1* | 12/2020 | Liu ..................... H04N 19/61 |

FOREIGN PATENT DOCUMENTS

| | | |
|---|---|---|
| CN | 105516728 A | 4/2016 |
| CN | 107633538 A | 1/2018 |
| CN | 109076237 A | 12/2018 |
| CN | 111050183 A | 4/2020 |
| EP | 3863287 A1 | 8/2021 |
| JP | 2015231091 A | 12/2015 |

OTHER PUBLICATIONS

Filippov et al., WO 2020256599 A1.*
International Search Report in the international application No. PCT/CN2020/090688, dated Aug. 12, 2020.
Bross B et al : "Versatile Video Coding (Draft 5)",14. JVET Meeting; Mar. 19, 2019-Mar. 27, 2019; Geneva; (The Joint Video Exploration Team of ISO/IEC JTC1/SC29/WG11 and ITU-T SG. 16 ), No. JVET-N1001 Jul. 2, 2019 (Jul. 2, 2019), pp. 1-406, XP030220731, Retrieved from the Internet: URL:http:// phenix.int-evry.fr/jvet/doc_end_user/documents/14_Geneva/wg11/JVET-N1001-v10.zip JVET-N1001-v10.docx[retrieved on Jul. 2, 2019].
"Test Model 5 of Versatile Video Coding (VTM 5)",126. MPEG Meeting; Mar. 25, 2019-Mar. 29, 2019; Geneva; (Motion Picture Expert Group or ISO/IEC JTC1/SC29/WG11), No. n18371 Jul. 7, 2019 (Jul. 7, 2019), XP030222341, Retrieved from the Internet: URL:http://phenix.int-evry.fr/mpeg/doc_end_user/documents/ 126_ Geneva/wg11/w18371. zip w18371.docx[retrieved on Jul. 7, 2019].
J-Y Huo et al : "Non-CE3:Fixed downshifting for 8-bit MIP" 15.JVET Meeting; Jul. 3, 2019-Jul. 12, 2019 Gothenburg; (The Joint Video Exploration Team of ISO/IEC JTC1/SC29/WG11 and ITU-T SG.16 ), No. JVET-O1127 Jul. 7, 2019 (Jul. 7, 2019), XP030293849, Retrieved from the Internet:URL:https://jvet- experts.org/doc_end_user/documents/15_Gothenburg/wg11/JVET-O1127-v2.zip JVET-O1127-v1/JVET-O1127-v1 .docx[retrieved on Jul. 7, 2019].
Kondo (Sony) K et A L:"CE3-2:On rounding shift of MIP",16 . JVET Meeting;Oct. 1, 2019-Oct. 11, 2019;Geneva; (The Joi nt V Ideo Exploration Team O F ISO/ IEC JTC1/ SC29/WG11 and ITU-T SG .16),No. JVET-P0056; m49976 Sep. 18, 2019 (Sep. 18, 2019), XP030216081 ,Retrieved from the Internet :URL:http :// phenix .int-evry.fr/ j vet/ doc_end user/ documents/16 Geneva/ wg11/ JVET - P0056-v1z ip JVET - P0056 -v1/ JVET - P0056 -v1.docx[retrieved on Sep. 18, 2019].
Supplementary European Search Report in the European application No. 20836842.3, dated Sep. 1, 2021, 10 pages.
First Office Action of the Indian application No. 202117011503, dated Feb. 22, 2022, 7 pages.
First Office Action of the European application No. 20836842.3, dated Mar. 14, 2022, 5 pages.
Written Opinion of the International Search Authority in the international application No. PCT/CN2020/090688, dated Aug. 12, 2020, 7 pages.
First Office Action of the Canadian application No. 3113740, dated May 20, 2022.
First Office Action of the Chinese application No. 202110469722.1, dated Sep. 19, 2022.

* cited by examiner

METHOD FOR COLOUR COMPONENT PREDICTION, ENCODER, DECODER AND STORAGE MEDIUM

CROSS-REFERENCE TO RELATED APPLICATION

The present disclosure is a U.S. continuation application of International Application No. PCT/CN2020/090688, filed on May 15, 2020, which claims priority to the following applications.

1) Prior U.S. provisional patent application No. 62/872,488 filed in the name of Junyan Huo, Yanzhuo Ma and Wei Zhang on Jul. 10, 2019, and entitled "Matrix-Based Intra Prediction (MIP) Shift Unification According to Block Size and Mode Index";

2) Prior U.S. provisional patent application No. 62/872,830 filed in the name of Junyan Huo, Yanzhuo Ma and Wei Zhang on Jul. 11, 2019, and entitled "Methods and Apparatuses for Matrix-Based Intra Prediction (MIP) Shift Unification"; and 3) Prior U.S. provisional patent application No. 62/873,170 filed in the name of Junyan Huo. Yanzhuo Ma and Wei Zhang on Jul. 11, 2019, and entitled "Methods and Apparatuses for Matrix-Based Intra Prediction (MIP) Shift Unification".

The contents of the International Application No. PCT/CN2020/090688, U.S. provisional patent application No. 62/872,488, U.S. provisional patent application No. 62/872,830, and U.S. provisional patent application No. 62/873,170 are incorporated herein by reference in their entirety.

BACKGROUND

With the increased requirements of people on video display quality, novel video application forms such as high-definition and ultra-high-definition videos have emerged. H.265/High Efficiency Video Coding (HEVC) cannot meet a requirement for rapid development of video applications any longer. The Joint Video Exploration Team (JVET) proposes a next-generation video coding standard H.266/Versatile Video Coding (VVC), and a corresponding test model is a VVC Test Model (VTM).

SUMMARY

Embodiments of the disclosure relate to the technical field of video coding and decoding, and particularly to a method for image component prediction, a coder, a decoder and a storage medium.

The technical solutions of the embodiments of the application may be implemented as follows.

According to a first aspect, the embodiments of the application provide a method for colour component prediction, which may be applicable for an encoder and include the following operations.

Prediction parameters of a current block are determined, the prediction parameters including a prediction mode parameter and a size parameter of the current block.

When the prediction mode parameter indicates that an MIP mode is adopted to determine an intra prediction value of the current block, an MIP weight matrix of the current block, a shift factor of the current block and an MIP input sample matrix of the current block are determined.

The intra prediction value of the current block is determined according to the MIP weight matrix, the shift factor and the MIP input sample matrix. The MIP weight matrix of the current block may be at least determined according to a block size index value of the current block and the block size index value of the current block may be determined according to the size parameter of the current block.

According to a second aspect, the embodiments of the application provide a method for colour component prediction, which may be applicable for a decoder and include the following operations.

A bitstream is parsed to acquire prediction parameters of a current block, the prediction parameters including a prediction mode parameter and a size parameter of the current block.

When the prediction mode parameter indicates that an MIP mode is adopted to determine an intra prediction value of the current block, an MIP weight matrix of the current block, a shift factor of the current block and an MIP input sample matrix of the current block are determined.

The intra prediction value of the current block is determined according to the MIP weight matrix, the shift factor and the MIP input sample matrix. The MIP weight matrix of the current block may be at least determined according to a block size index value of the current block and the block size index value of the current block may be determined according to the size parameter of the current block.

According to a third aspect, the embodiments of the application provide an encoder, which may include a first determination unit and a first prediction unit.

The first determination unit may be configured to determine prediction parameters of a current block, the prediction parameters including a prediction mode parameter and a size parameter of the current block.

The first determination unit may further be configured to, when the prediction mode parameter indicates that an MIP mode is adopted to determine an intra prediction value of the current block, determine an MIP weight matrix of the current block, a shift factor of the current block and an MIP input sample matrix of the current block.

The first prediction unit may be configured to determine the intra prediction value of the current block according to the MIP weight matrix, the shift factor and the MIP input sample matrix. The MIP weight matrix of the current block may be at least determined according to a block size index value of the current block and the block size index value of the current block may be determined according to the size parameter of the current block.

According to a fourth aspect, the embodiments of the application provide an encoder, which may include a memory and a processor.

The memory may be configured to store computer programs capable of running in the processor.

The processor may be configured to run the computer programs to execute the method as described in the first aspect.

According to a fifth aspect, the embodiments of the application provide a decoder, which may include a parsing unit, a second determination unit and a second prediction unit.

The parsing unit may be configured to parse a bitstream to acquire prediction parameters of a current block, the prediction parameters including a prediction mode parameter and a size parameter of the current block.

The second determination unit may be configured to, when the prediction mode parameter indicates that an MIP mode is adopted to determine an intra prediction value of the current block, determine an MIP weight matrix of the current block, a shift factor of the current block and an MIP input sample matrix of the current block.

The second prediction unit may be configured to determine the intra prediction value of the current block according to the MIP weight matrix, the shift factor and the MIP input sample matrix. The MIP weight matrix of the current block may be at least determined according to a block size index value of the current block and the block size index value of the current block may be determined according to the size parameter of the current block.

According to a sixth aspect, the embodiments of the application provide a decoder, which may include a memory and a processor.

The memory may be configured to store computer programs capable of running in the processor.

The processor may be configured to run the computer programs to execute the method as described in the aspect.

According to a seventh aspect, the embodiments of the application provide a computer storage medium, which may store computer programs. The computer programs may be executed by a first processor to implement the method as described in the first aspect or may be executed by a second processor to implement the method as described in the second aspect.

DETAILED DESCRIPTION

Figure 1:
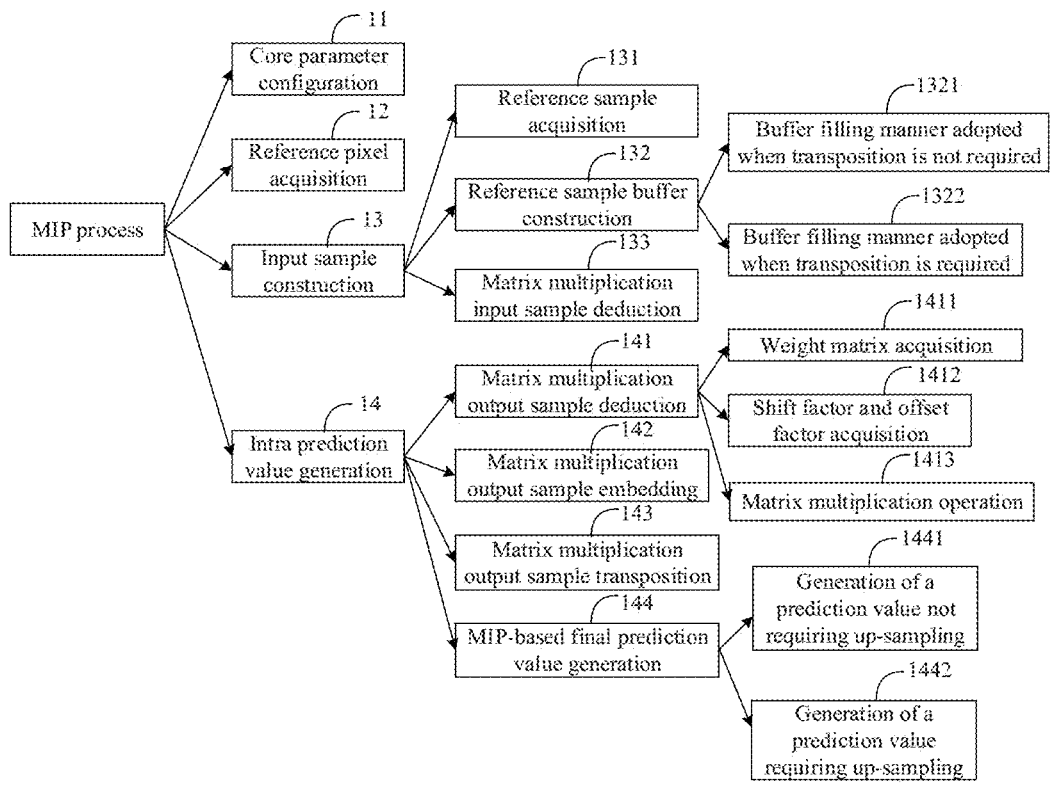
FIG. 1 is a flow block diagram of an MIP process according to related technical solutions.

In H.266/VVC, an Matrix-based Intra Prediction (MIP) technology has been accepted at present. In the technology, different numbers of MIP modes are added in an intra prediction process for different types of intra current blocks. However, in an MIP process, particularly in a matrix multiplication process, determination for a shift factor is also correlated with a type of a current block and an index number of an MIP mode, which causes the prediction process relatively complex and increases the calculation complexity.

The embodiments of the application provide a method for colour component prediction, an encoder, a decoder and a storage medium. On an encoder side, prediction parameters of a current block may be determined, the prediction parameters including a prediction mode parameter and a size parameter of the current block; when the prediction mode parameter indicates that an MIP mode is adopted to determine an intra prediction value of the current block, an MIP weight matrix of the current block, a shift factor of the current block and an MIP input sample matrix of the current block are determined; and the intra prediction value of the current block is determined according to the MIP weight matrix, the shift factor and the MIP input sample matrix. The MIP weight matrix of the current block may be at least determined according to a block size index value of the current block and the block size index value of the current block may be determined according to the size parameter of the current block. On a decoder side, a bitstream is parsed to acquire prediction parameters of a current block, the prediction parameters including a prediction mode parameter and a size parameter of the current block; when the prediction mode parameter indicates that an MIP mode is adopted to determine an intra prediction value of the current block, an MIP weight matrix of the current block, a shift factor of the current block and an MIP input sample matrix of the current block are determined; and the intra prediction value of the current block is determined according to the MIP weight matrix, the shift factor and the MIP input sample matrix. The MIP weight matrix of the current block may be at least determined according to a block size index value of the current block and the block size index value of the current block may be determined according to the size parameter of the current block. In such a manner, on either the decoder side or the encoder side, a determination manner for the shift factor may be simplified, and moreover, when the shift factor is determined by use of a Look-Up Table (LUT), a memory occupied by storage of a LUT may be reduced at the same time of reducing the calculation complexity, so that a purpose of improving the coding and decoding efficiency is achieved.

In order to understand the characteristics and technical contents of the embodiments of the application in more detail, implementation of the embodiments of the application will be described in detail below in combination with reference to the accompanying drawings. The accompanying drawings are for reference only and are not intended to limit the embodiments of the disclosure.

In a video signal, a first colour component, a second colour component and a third colour component are usually adopted to represent Coding Blocks (CBs). The three colour components are a luma component, a blue chroma component and a red chroma component respectively. Specifically, the luma component is usually represented by a sign Y, the blue chroma component is usually represented by a sign Cb or U, and the red chroma component is usually represented by a sign Cr or V. Therefore, the video signal may be represented in a YCbCr format, and may also be represented in a YUV format.

In the embodiments of the application, the first colour component may be the luma component, the second colour component may be the blue chroma component, and the third colour component may be the red chroma component. However, no specific limits are made in the embodiments of the application.

A related technical solution to a present prediction process of an MIP technology will be described below.

Input data of MIP mainly includes a position (xTbCmp, yTbCmp) of a current block, an MIP mode index value (which may be represented by modeId or modeIdx) when the MIP is adopted by the present block, a height (represented by nTbH) of the current block, a width (represented by nTbW) of the current block, a transposition processing indicator (which may be represented by isTransposed) indicating whether transposition is required and the like.

Output data of MIP mainly includes a prediction block of the current block. A prediction value corresponding to a pixel coordinate [x][y] in the prediction block is predSamples[x][y], where x=0, 1 . . . , nTbW−1, and y=0, 1, . . . , nTbH−1.

Here, as shown in FIG. 1, the MIP process may be divided into four operations: core parameter configuration 11, reference pixel acquisition 12, input sample construction 13 and intra prediction value generation 14. Specifically, for core parameter configuration 11, the current block may be divided into three types according to a size of the intra current block, and mipSizeId or blocksizeIdx is adopted as a block size index value to record the type of the current block. Moreover, current blocks corresponding to different block size index values have different numbers of reference samples and different numbers of matrix multiplication output samples. For reference pixel acquisition 12, when the current block is predicted, upper block and left block of the current block are coded blocks, reference pixels of the MIP technology are reconstructed values of pixels in an upper row and a left column of the current block, and a process of acquiring the reference pixels (represented by refT) adjacent to an upper side of the current block and the reference pixels (represented by refL) adjacent to a left side of the current block is a reference pixel acquisition process. For input sample construction 13, the operation is used for input of matrix multiplication, and may mainly include reference sample acquisition 131, reference sample buffer construction 132 and matrix multiplication input sample deduction 133. A reference sample acquisition process is a down-sampling process. Reference sample buffer construction 132 may further include a buffer filling manner 1321 adopted when transposition is not required and a buffer filling manner 1322 adopted when transposition is required. For intra prediction value generation 14, the operation is executed to acquire an MIP-based prediction value of the current block, and may mainly include matrix multiplication output sample block 141, matrix multiplication output sample embedding 142, matrix multiplication output sample transposition 143 and MIP-based final prediction value generation 144. Matrix multiplication output sample block construction 11 may further include weight matrix acquisition 1411, shift factor and offset factor acquisition 1412 and matrix multiplication operation 1413. MIP-based final prediction value generation 144 may further include generation of a prediction value not requiring up-sampling 1441 and generation of a prediction value requiring up-sampling 1442. Then, after the four operations, an intra prediction value of at least one pixel in the current block may be obtained.

In the MIP process shown in FIG. 1, MIP may be represented by the following equation.

$$P = M \times R \qquad (1)$$

M is a matrix, R is an input sample vector deduced from a reference sample pixel, and P is a prediction pixel value deduced according to the equation (I). That is, MIP is a coding tool and may be used to deduce an intra prediction signal including matrix multiplication. Each specific matrix M corresponds to an MIP mode.

However, the coefficients of the matrix are initially trained to floating point values, but these coefficients are required to be stored and calculated to integral values in a computer processing process. A common manner for converting a floating point value to an integral value is usually to multiply the floating point value and a great enough value to maintain appropriate accuracy, and this manner is usually called shift operation. Specifically, a left shift operation aims to deduce an integral value and may be implemented through the following equation.

$$VAL = val \times (1 << shift) \qquad (2)$$

Herein, val is a floating matrix value, shift is a shift bit number (which may also be called a shift factor) in the shift operation, VAL is a stored integral value, and "<<" represents a left shift operator.

In such a manner, after an integral matrix is obtained, integral matrix multiplication may be performed. Finally, a right shift operation is executed on P to obtain an MIP-based final prediction value. A calculation equation for the whole process is as follows:

$$P = (M^* (1 << shift) \times R) >> shift \qquad (3)$$

or, $$P = (M^* (1 << shift) \times R + (1 << (shift-1))) >> shift \qquad (4)$$

Herein. (1<<(shift−1)) represents a rounding operation, and ">>" represents a right shift operator. However, in the latest MIP version, for different block sizes and different MIP modes, corresponding values of shift in the shift operation in the equation (3) or the equation (4) are different. That is, a current shift factor is closely correlated with a type of a current block and an index value of an MIP mode, which makes the prediction process relatively complex and increases the calculation complexity.

The embodiments of the application provide a method for colour component prediction, which is applicable for an encoder or a decoder. After prediction parameters of a current block is obtained, when a prediction mode parameter in the prediction parameters indicates that an MIP mode is adopted to determine an intra prediction value of the current block, an MIP weight matrix of the current block, a shift factor of the current block and an MIP input sample matrix of the current block may be determined, and then the intra prediction value of the current block is determined according to the MIP weight matrix, the shift factor and the MIP input sample matrix. In such a manner, on either the decoder side or the encoder side, a determination manner for the shift factor may be simplified, and moreover, when the shift factor is determined by use of a LUT, a memory occupied by storage of the LUT may be reduced at the same time of reducing the calculation complexity to achieve a purpose of improving the encoding and decoding efficiency.

Embodiments of the application will be described below in combination with the drawings in detail.

Figure 2A:
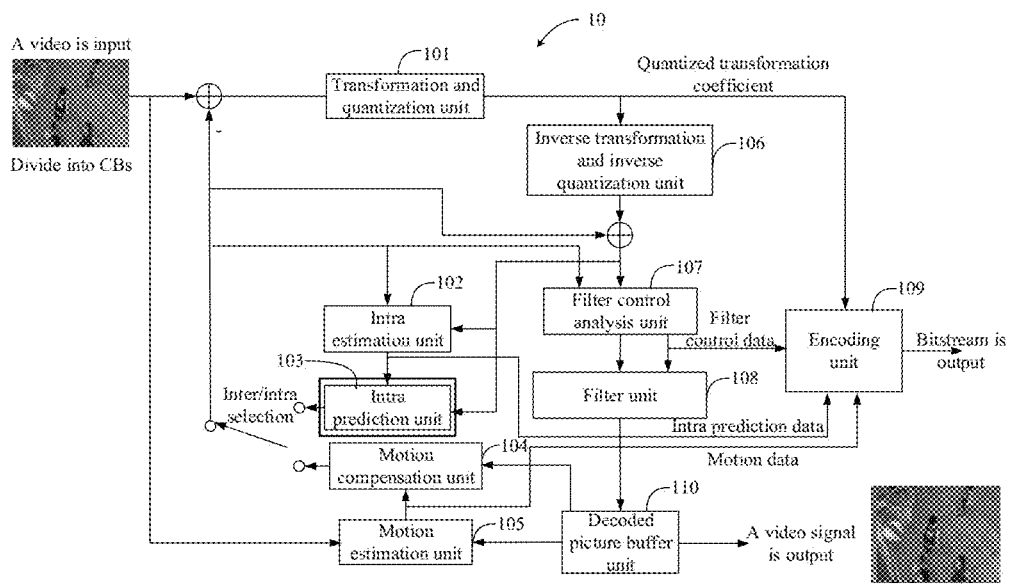
FIG. 2A is a composition block diagram of a video encoding system according to embodiments of the application.

Referring to FIG. 2A, a composition block diagram example of a video coding system according to embodiments of the application is shown. As shown in FIG. 2A, the video encoding system 10 includes a transformation and quantization unit 101, an intra estimation unit 102, an intra prediction unit 103, a motion compensation unit 104, a motion estimation unit 105, an inverse transformation and inverse quantization unit 106, a filter control analysis unit 107, a filter unit 108, an encoding unit 109 and a decoded picture buffer unit 110, etc. The filter unit 108 may implement deblocking filtering and Sample Adaptive Offset (SAO) filtering. The encoding unit 109 may implement header information coding and Context-based Adaptive Binary Arithmetic Coding (CABAC). For an input video signal, a video CB may be obtained by division of a Coding Tree Unit (CTU), and then residual pixel information obtained by intra or inter prediction is processed through the transformation and quantization unit 101 to transform the video CB, including transforming the residual information from a pixel domain to a transformation domain, and an obtained transformation coefficient is quantized to further reduce a bit rate. The intra estimation unit 102 and the intra prediction unit 103 are configured to perform intra prediction on the video CB. Exactly, the intra estimation unit 102 and the intra prediction unit 103 are configured to determine an intra prediction mode to be used to coding the video CB. The motion compensation unit 104 and the motion estimation unit 105 are configured to execute intra prediction coding on the received video CB relative to one or more blocks in one or more reference frames to provide time prediction information. Motion estimation executed by the motion estimation unit 105 is a process of generating a motion vector. A motion of the video CB may be estimated according to the motion vector, and then the motion compensation unit 104 executes motion compensation based on the motion vector determined by the motion estimation unit 105. After the intra prediction mode is determined, the intra prediction unit 103 is further configured to provide selected intra prediction data to the encoding unit 109, and the motion estimation unit 105 also sends motion vector data determined by calculation to the encoding unit 109. In addition, the inverse transformation and inverse quantization unit 106 is configured to reconstruct the video CB. A residual block is reconstructed in the pixel domain, a blocking effect artifact in the reconstructed residual block is removed through the filter control analysis unit 107 and the filter unit 108 and then the reconstructed residual block is added to a predictive block in a frame of the decoded picture buffer unit 110 to generate a reconstructed video CB. The encoding unit 109 is configured to code various coding parameters and quantized transformation coefficients. In a CABAC-based coding algorithm, a context content may be based on adjacent CBs and may be configured to code information indicating the determined intra prediction mode to output a bitstream of the video signal. The decoded picture buffer unit 110 is configured to store the reconstructed video CB as a prediction reference. As video signals are coded, new reconstructed video CBs may be continuously generated, and these reconstructed video CBs may be stored in the decoded picture buffer unit 110.

Figure 2B:
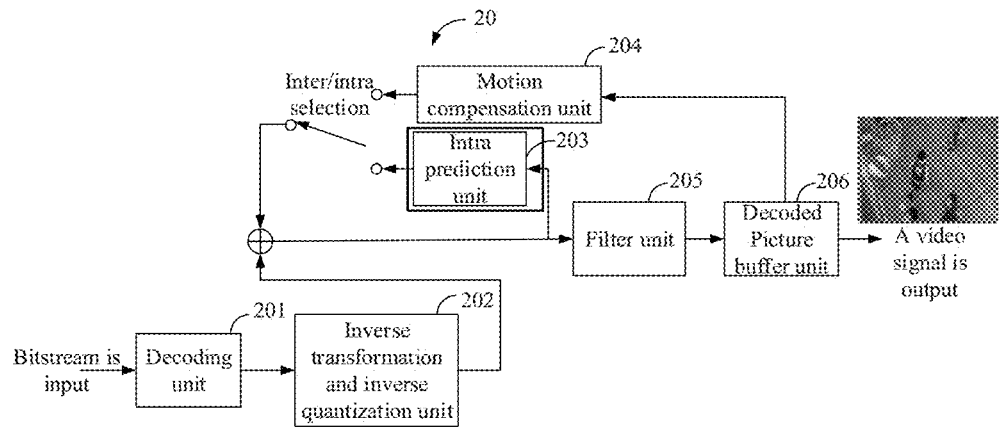
FIG. 2B is a composition block diagram of a video decoding system according to embodiments of the application.

Referring to FIG. 2B, a composition block diagram example of a video decoding system according to embodiments of the application is shown. As shown in FIG. 2B, the video decoding system 20 includes a decoding unit 201, an inverse transformation and inverse quantization unit 202, an intra prediction unit 203, a motion compensation unit 204, a filter unit 205 and a decoded picture buffer unit 206, etc. The decoding unit 201 may implement header information decoding and CABAC decoding. The filter unit 205 may implement deblocking filtering and SAO filtering. After encoding processing shown in FIG. 2A is performed on an input video signal, a bitstream of the video signal is output. The bitstream is input to the video decoding system 20, and is processed through the decoding unit 201 at first to obtain a decoded transformation coefficient. The transformation coefficient is processed by the inverse transformation and inverse quantization unit 202 so that a residual block is generated in a pixel domain. The intra prediction unit 203 may be configured to generate prediction data of a present video decoding block based on a determined intra prediction mode and data of a previous decoded block from a present frame or picture. The motion compensation unit 204 analyzes a motion vector and other associated syntactic elements to determine prediction information for the video decoding block and generates, by use of the prediction information, a predictive block of the video decoding block that is presently decoded. The residual block from the inverse transformation and inverse quantization unit 202 and the corresponding predictive block generated by the intra prediction unit 203 or the motion compensation unit 204 are summed to form a decoded video block. A blocking effect artifact in the decoded video signal may be removed through the filter unit 205 to improve the video quality. Then, the decoded video block is stored in the decoded picture buffer unit 206. The decoded picture buffer unit 206 stores a reference picture for subsequent intra prediction or motion compensation and is also configured to output a video signal, namely the recovered video signal is obtained.

The method for colour component prediction in the embodiments of the application is mainly applied to the part of the intra prediction unit 103 shown in FIG. 2A and the part of the intra prediction unit 203 shown in FIG. 2B. That is, the method for colour component prediction in the embodiments of the application may be applicable for not only the video encoding system but also the video decoding system and may even be applicable for the video encoding system and the video decoding system at the same time. However, no specific limits are made in the embodiments of the application. It is also to be noted that, when the colour component prediction method is applied to the part of the intra prediction unit 103, the "current block" specifically refers to a current to-be-coded block in intra prediction, and when the colour component prediction method is applied to the part of the intra prediction unit 203, the "current block" specifically refers to a current to-be-decoded block in intra prediction.

Figure 3:
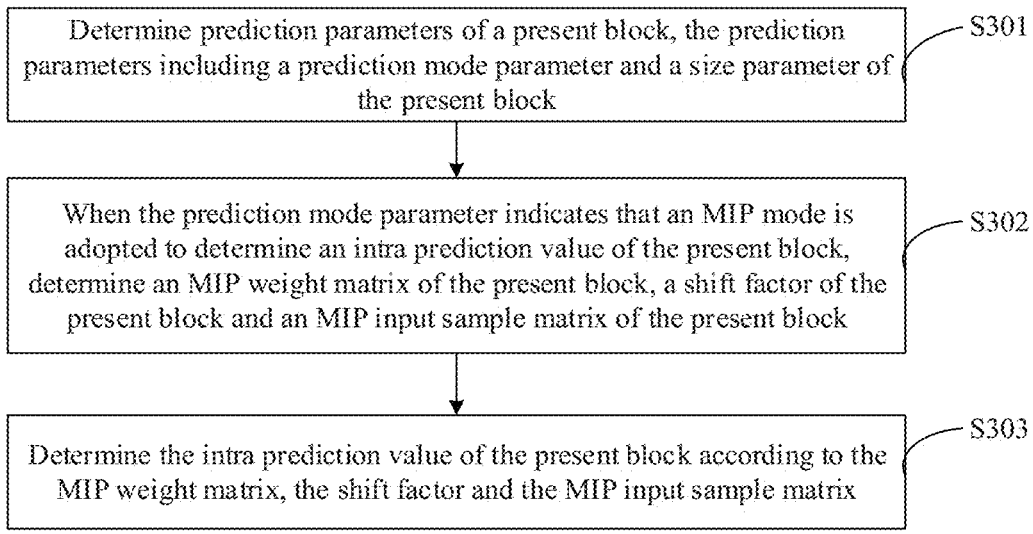
FIG. 3 is a flowchart of a method for colour component prediction according to embodiments of the application.

Based on the application scenario example shown in FIG. 2A, referring to FIG. 3, a flowchart of a method for colour component prediction according to embodiments of the application is shown. As shown in FIG. 3, the method may include the following operations.

In S301, prediction parameters of a current block are determined, the prediction parameters including a prediction mode parameter and a size parameter of the current block.

It is to be noted that the method is applicable for an encoder. A video signal may be divided into multiple blocks, and each current to-be-coded block may be called a Coding Block (CB). Here, each CB may include a first colour component, a second colour component and a third colour component. The current block is a to-be-coded block, of which the first colour component, second colour component and third colour component are presently to be predicted, in the video signal.

If the first colour component of the current block is to be predicted and the first colour component is a luma component, namely a to-be-predicted colour component is the luma component, the current block may also be called a luma block. Or, if the second colour component of the current block is to be predicted and the second colour component is a chroma component, namely the to-be-predicted colour component is the chroma component, the current block may also be called a chroma block.

It is also to be noted that the prediction parameters indicate a prediction mode for the current block and parameters related to the prediction mode. Here, the prediction parameters may be determined by a simple decision strategy, for example, determined according to a magnitude of a distortion value, and may also be determined by a complex decision strategy, for example, determined according to a Rate Distortion Optimization (RDO) result. No limits are made in the embodiments of the application. Generally, the prediction parameters of the current block may be determined in an RDO manner.

Specifically, in some embodiments, for S301, the operation that the prediction parameters of the current block are determined may include the following operations.

Precoding processing is performed on the current block by using multiple prediction modes to obtain rate distortion cost values corresponding to all prediction modes.

A minimum rate distortion cost value is selected from the obtained multiple rate distortion cost values, and a prediction parameter in the prediction mode corresponding to the minimum rate distortion cost value is determined as the prediction parameter of the current block.

That is, on an encoder side, for the current block, precoding processing may be performed on the current block by using the multiple prediction modes respectively. Here, the multiple prediction modes usually include an inter prediction mode and an intra prediction mode. The intra prediction mode may further include a conventional intra prediction mode and an unconventional intra prediction mode. Specifically, the conventional intra prediction mode may include a Direct Current (DC) mode, a planar mode and an angular mode, etc., and the unconventional intra prediction mode may include an MIP mode, a Cross-Component Linear Model (CCLM) prediction mode, an Intra Block Copy (IBC) mode and a Palette (PLT) mode, etc. The inter prediction mode may include a conventional inter prediction mode and a Geometrical partitioning for inter blocks (GEO) mode, etc.

In such a manner, after the current block is precoded by using the multiple prediction modes respectively, the rate distortion cost value corresponding to each prediction mode may be obtained, then the minimum rate distortion cost value is selected from the obtained multiple rate distortion cost values, and the prediction parameter in the prediction mode corresponding to the minimum rate distortion cost value is determined as the prediction parameter of the current block. In addition, after the current block is precoded by using the multiple prediction modes respectively, a distortion value corresponding to each prediction mode may also be obtained, then a minimum cost value is selected from the obtained multiple distortion values, and prediction parameters in the prediction mode corresponding to the minimum distortion value are determined as the prediction parameters of the current block. In such a manner, the current block is finally coded by use of the determined prediction parameters. Under the prediction mode, a predicted residual may be relatively small, and the encoding efficiency may be improved.

In S302, when the prediction mode parameter indicates that an MIP mode is adopted to determine the intra prediction value of the current block, an MIP weight matrix of the current block, a shift factor of the current block and an MIP input sample matrix of the current block are determined.

It is to be noted that, for the current block, if the MIP mode is adopted for the current block to determine the intra prediction value of the current block, the MIP input sample matrix of the current block, the MIP weight matrix of the current block and the shift factor of the current block are needed to be determined. The shift factor may also be called a shift bit number, a weight shift value and the like, and may be represented by sW, shift or weight shift.

It should be understood that, for the MIP mode, an MIP core parameter is needed to be configured at first. Here, in the MIP mode, the current block may be divided into three types according to a width and height of the current block, and a type of the current block, i.e., a block size index value of the current block, may be represented by mipSizeId or BlocksizeIdx. For different block size index values, numbers of reference sample (boundarySize reference samples are needed on each side), numbers inSize of matrix multiplication input sample and numbers of matrix multiplication output sample (arranged to be predSize×predSize) are different.

Optionally, in some embodiments, the operation that the block size index value of the current block is determined according to the size parameter of the current block may include the following operations.

If both the width and height of the current block are equal to 4, the block size index value of the current block may be set equal to 0.

Or, if both the width and height of the current block are equal to 8 or one of the width and height of the current block is equal to 4, the block size index value of the current block may be set equal to 1.

Or, if the current block is a block in another size, the block size index value of the current block may be set equal to 2.

Optionally, in some embodiments, the operation that the block size index value of the current block is determined according to the size parameter of the current block may include the following operations.

If both the width and height of the current block are equal to 4, the block size index value of the current block may be set equal to 0.

Or, if one of the width and height of the current block is equal to 4, the block size index value of the current block may be set equal to 1.

Or, if the current block is a block in another size, the block size index value of the current block may be set equal to 2.

In such a manner, according to the block size index value of the current block and a LUT shown as Table 1, the number of reference samples of an adjacent boundary (the variable is boundarySize) and a size of an MIP-based prediction block (the variable is predSize, the size of the MIP-based prediction block is predSize×predSize) may be determined, and the number (represented by inSize) of input sample for an MIP matrix multiplication operation process may be calculated. A calculation equation is as follows:

$$\text{inSize}=(2\times\text{boundarySize})-(\text{mipSizeId}=2)?1:0 \qquad (5).$$

Herein, an operation rule of an operator in the equation (5) is the same as an operator defined in an ITU-TH.265 standard. For example, " == " is a logical "equal to" operator

TABLE 1

| BlocksizeIdx | boundarySize | predSize |
|---|---|---|
| 0 | 2 | 4 |
| 1 | 4 | 4 |
| 2 | 4 | 8 |

Therefore, according to Table 1, when a value of BlocksizeIdx is 0, a value of boundarySize may be 2 and a value of predSize may be 4, namely reference pixels include two pixels selected from each side. A matrix multiplication output is a 4×4 MIP-based prediction block; or, when the value of BlocksizeIdx is 1, the value of boundarySize may be 4 and the value of predSize may be 4, namely the reference pixels include four pixels selected from each side. The matrix multiplication output is a 4×4 MIP-based prediction block; or, when the value of BlocksizeIdx is 2, the value of boundarySize may be 4 and the value of predSize may be 8, namely the reference pixels include four pixels selected from each side and the matrix multiplication output is an 8×8 MIP-based prediction block.

In addition, the values of boundarySize, inSize and predSize may also be determined at the same time according to the block size index value of the current block and a LUT shown as Table 2.

TABLE 2

| BlocksizeIdx | boundarySize | inSize | predSize |
|---|---|---|---|
| 0 | 2 | 4 | 4 |
| 1 | 4 | 8 | 4 |
| 2 | 4 | 7 | 8 |

Therefore, according to Table 2, w % ben the value of BlocksizeIdx is 0, the value of boundarySize may be 2, a value of inSize may be 4 and the value of predSize may be 4, namely the reference pixels include two pixels selected from each side, the number of the matrix multiplication input samples is 4 and the matrix multiplication output is a 4×4 MIP-based prediction block; or, when the value of BlocksizeIdx is 1, the value of boundarySize may be 4, the value of inSize may be 8 and the value of predSize may be 4, namely the reference pixels include four pixels selected from each side, the number of the matrix multiplication input samples is 8 and the matrix multiplication output is a 4×4 MIP-based prediction block; or, when the value of BlocksizeIdx is 2, the value of boundarySize may be 4, the value of inSize may be 7 and the value of predSize may be 8, namely the reference pixels include four pixels selected from each side, the number of the matrix multiplication input samples is 7 and the matrix multiplication output is an 8×8 MIP-based prediction block.

Furthermore, after the MIP core parameter is configured, the reference pixels are further needed to be acquired to construct the MIP input sample matrix. Specifically, in some embodiments, the operation that the MIP input sample matrix of the current block is determined may include the following operations.

An adjacent reference sample set of the current block is determined, the adjacent reference sample set including at least one reference sample value.

The adjacent reference sample set is buffered to construct an input reference sample value set.

The MIP input sample matrix is determined according to the input reference sample value set.

It is to be noted that a matrix multiplication input sample (represented by P) is an input for a matrix multiplication process and the matrix multiplication output sample (represented by predMip) may be obtained after multiplication with a corresponding matrix. The matrix multiplication input sample P is determined by a buffer (represented by pTemp), the block size index value (represented by BlocksizeIdx) of the current block and a bit depth value (represented by BitDepth) corresponding to the to-be-predicted colour component, the number inSize of the input reference samples in the matrix multiplication input sample P is correlated with the block size index value of the current block only, and an xth input sample value (represented by P[x]) in the input sample matrix may finally be acquired.

Here, a specific construction process of the input sample matrix P[x] is as follows.

When BlocksizeIdx=0 or 1, (1<<(BitDepth−1)) is needed to be subtracted from a sample value of a 0th position in pTemp to obtain a sample value of a 0th position in the input sample matrix, represented by P[0], and then a sample value corresponding to each position of other positions in the input sample matrix is obtained by subtracting the value of the 0th position in pTemp from a sample value of a corresponding position in pTemp, and may be represented by P[x], specifically as follows:

$$\begin{cases} p[0] = pTemp[0] - (1 << (BitDepth - 1)) \\ p[x] = pTemp[x] - pTemp[0] \text{ for } x-1, \ldots, inSize - 1 \end{cases} \quad (6)$$

When BlocksizeIdx=2, the sample value corresponding to each position of the other positions in the input sample matrix is obtained by subtracting the sample value corresponding to the 0th position in pTemp from the sample value of the next position of the corresponding position in pTemp, specifically as follows:

$$p[x]=pTemp[x+1]-pTemp[0] \text{ for } x=0, \ldots, inSize-1 \quad (7)$$

Still taking a 4×4 current block as an example, four values are stored in the buffer pTemp, but the number of the input samples is 4. In such case, four input sample values, represented by p[x], x=0, 1, 2, 3, may be determined according to the equation (3) or the equation (4), thereby obtaining a 1×4 MIP input sample matrix.

Furthermore, a weight matrix table is pre-created in the encoder, and the weight matrix table is stored in the encoder. Therefore, the MIP weight matrix needed to be adopted for the current block, represented by mWeight[x][y], may be determined in a table lookup manner according to the block size index value (BlocksizeIdx) of the current block and an MIP mode index value (modeIdx). A size of the MIP weight matrix mWeight[x][y] is correlated with the block size index value of the current block only, as shown in Table 3. In the MIP weight matrix, the column number is the number inSize of the matrix multiplication input samples, and the row number is the number predSized×predSized of the matrix multiplication output samples. Therefore, the MIP weight matrix of the current block may be determined.

TABLE 3

| mipSizeId | Column number | Row number |
|---|---|---|
| 0 | 4 | 16 |
| 1 | 8 | 16 |
| 2 | 7 | 64 |

Furthermore, a shift table is also pre-created in the encoder, and the shift table is also stored in the encoder. At present, in the latest MIP version, for different block sizes and different MIP mode index values, shifted bit numbers (i.e., shift factors) in a shift operation are different. As shown in Table 4, the shift factor needed to be used for matrix multiplication may be determined in the table lookup manner according to the block size index value (BlocksizeIdx) of the current block and the MIP mode index value (modeIdx, also called modeId).

TABLE 4

| blocksizeIdx | modeId | | | | | | | | | | | | | | | | | |
| --- | --- | --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 5 | 6 | 5 | 5 | 6 | 5 | 6 | 6 | 6 | 6 | 6 | 5 | 6 | 5 | 5 |
| 1 | 6 | 6 | 6 | 6 | 6 | 6 | 6 | 6 | 6 | 7 | | | | | | | | |
| 2 | 6 | 6 | 6 | 7 | 5 | 6 | | | | | | | | | | | | |

However, on the encoder side, Table 4 is needed to be stored in a computer memory in form of a LUT. There are costs for storage as well as a lookup process. Since the shift factor is correlated with both a block size of the current block and the MIP mode index value in Table 4, an occupied memory is enlarged, and the calculation complexity is also increased.

For reducing the occupied memory and reducing the calculation complexity, a determination manner for the shift factor is simplified in the embodiments of the application. Specifically, in some embodiments, the shift factor of the current block may include a constant shift factor or a shift factor determined according to the prediction parameter.

In a possible implementation mode, the shift factor may be set equal to a fixed constant value. For example, for different block size index values and different MIP mode index values, the shift factor may be set equal to 5. Or, for different block size index values and different MIP mode index values, the shift factor may be set equal to 6. Or, for different block size index values and different MIP mode index values, the shift factor may be set equal to 7. In the embodiment of the application, a value of the constant shift factor is preferably equal to 6, but no specific limits are made thereto.

In another possible implementation mode, the operation that the shift factor is determined according to the prediction parameter may include the following operations.

The block size index value of the current block is determined according to the size parameter of the current block.

The shift factor is determined according to the block size index value of the current block.

It is to be noted that the block size index value of the current block may be determined according to the size parameter of the current block. Specifically, the operation that the block size index value of the current block is determined according to the size parameter of the current block may include the following operations.

When both the width and height of the current block are equal to 4, the block size index value of the current block is set equal to 0.

When both the width and height of the current block are equal to 8 or one of the width and height of the current block is equal to 4, the block size index value of the current block is set equal to 1.

When both the width and height of the current block do not meet the above conditions, the block size index value of the current block is set equal to 2.

In such a manner, after the block size index value of the current block is determined, the shift factor may further be determined according to the block size index value of the current block in combination with the number of the MIP input sample values or the size of the MIP-based prediction block.

Optionally, in some embodiments, the operation that the shift factor is determined according to the block size index value of the current block may include the following operation.

The shift factor is set equal to a ratio of the width or height of the current block to a first preset value corresponding to the block size index value of the current block.

Here, the first preset value represents the number of MIP input sample values obtained from a boundary of the current block. In such case, the method may further include the following operation.

When the block size index value of the current block is equal to 0, 1 and 2 respectively, it is determined that the first preset value corresponding to the block size index value of the current block is equal to 2, 4 and 4 respectively.

That is, when the first preset value represents the number of the MIP input sample values obtained from the boundary of the current block, if the block size index value of the current block is equal to 0, the corresponding first preset value is equal to 2; if the block size index value of the current block is equal to 1, the corresponding first preset value is equal to 4; and if the block size index value of the current block is equal to 2, the corresponding first preset value is equal to 4. Therefore, the shift factor may be determined according to the ratio of the width or height of the current block to the corresponding first preset value.

Optionally, in some embodiments, the operation that the shift factor is determined according to the block size index value of the current block may include the following operation.

The shift factor is set equal to a ratio of the width or height of the current block to a second preset value corresponding to the block size index value of the current block.

Here, the second preset value represents the size of the MIP-based prediction block, obtained by direct use of the MIP weight matrix, of the current block. In such case, the method may further include the following operation.

When the block size index value of the current block is equal to 0, 1 and 2 respectively, it is determined that the second preset value corresponding to the block size index value of the current block is equal to 4, 4 and 8 respectively.

That is, when the second preset value represents the size of the MIP-based prediction block, obtained by directly using the MIP weight matrix for calculation, of the current block, if the block size index value of the current block is equal to 0, the corresponding second preset value is equal to 4; if the block size index value of the current block is equal to 1, the corresponding second preset value is equal to 4; and if the block size index value of the current block is equal to 2, the corresponding second preset value is equal to 8. Therefore, the shift factor may be determined according to the ratio of the width or height of the current block to the corresponding second preset value.

In another possible implementation mode, the shift table may be minimized, and the shift factor is still determined in the table lookup manner. Optionally, in some embodiments, for S302, the method may further include the following operations.

The block size index value of the current block is determined according to the size parameter of the current block.

A shift factor corresponding to the determined block size index value is queried in a first preset LUT according to the determined block size index value, the first preset LUT being configured to record corresponding values of the block size index values and the shift factors.

The queried shift factor is determined as the shift factor of the current block.

It is to be noted that the shift factor may be queried according to the block size index value (represented by blocksizeIdx) of the current block only. In the first preset LUT shown as Table 5, each block size index value may correspond to a fixed shift factor. That is, there is fixed shift value shown in Table 5 for a size of each block or a size set of each block. Here, blocksizeIdx is a block size index value corresponding to the size of the current block or a size of a group of blocks.

TABLE 5

| blocksizeIdx | weight shift |
|---|---|
| 0 | 5 |
| 1 | 6 |
| 2 | 6 |

In another possible implementation mode, the shift table may also be minimized, and the shift factor is still determined in the table lookup manner. Optionally, in some embodiments, For S302, the method may further include the following operations.

When the prediction mode parameter indicates that the MIP mode is adopted to determine the intra prediction value of the current block, an MIP mode category index value of the current block is determined.

A shift factor corresponding to the determined MIP mode category index value is queried in a second preset LUT according to the determined MIP mode category index value, the second preset LUT being configured to record corresponding values of the MIP mode category index values and the shift factors.

The queried shift factor is determined as the shift factor of the current block.

It is to be noted that the shift factor may be queried according to the MIP mode category index value (represented by ModeCategoryIdx) of the current block only. In the second preset LUT shown as Table 6, each MIP mode category index value may correspond to a fixed shift factor. That is, the fixed shift value shown in Table 6 may be executed according to ModeCategoryIdx. Here, ModeCategoryIdx is a category index value corresponding to the MIP mode or a set of MIP modes.

TABLE 6

| ModeCategoryIdx | weight shift |
|---|---|
| 0 | 5 |
| 1 | 6 |
| 2 | 7 |

Furthermore, ModeCategoryIdx may be deduced according to the MIP mode index value. Specifically, the operation that the MIP mode category index value of the current block is determined may include the following operations.

The block size index value corresponding to the current block and the MIP mode index value when the MIP mode is adopted for prediction are determined.

The MIP mode category index value of the current block is determined according to the block size index value and the MIP mode index value.

That is, after the block size index value of the current block and the MIP mode index value are obtained, the MIP mode category index value may be calculated in a hash manner, or the MIP mode category index value may also be determined according to a condition judgment.

Optionally, the MIP mode category index value is calculated in the hash manner. In some embodiments, the operation that the MIP mode category index value of the current block is determined according to the block size index value and the MIP mode index value may include the following operations.

When the block size index value is equal to 0, right shift processing is performed on the MIP mode index value by use of a first preset shift value to obtain the MIP mode category index value of the current block.

Or, when the block size index value is equal to 1, right shift processing is performed on the MIP mode index value by use of the first preset shift value to obtain a right-shifted value, and superimposition processing is performed on the right-shifted value and a third preset value to obtain the MIP mode category index value of the current block.

Or, when the block size index value is equal to 2, right shift processing is performed on the MIP mode index value by use of a second preset shift value to obtain the MIP mode category index value of the current block.

It is to be noted that the first preset shift value may be 3, the second preset shift value may be 2 and the third preset value may be 1.

Exemplarily, when the block size index value (blocksizeIdx) is equal to 0, the MIP mode index value (modeIdx) may be shifted to the right by 3 to obtain the MIP mode category index value; when the block size index value (blocksizeIdx) is equal to 1, the MIP mode index value (modeIdx) may be shifted to the right by 3, and then a result is superimposed with 1 to obtain the MIP mode category index value; and when the block size index value (blocksizeIdx) is equal to 2, the MIP mode index value (modeIdx) may be shifted to the right by 2 to obtain the MIP mode category index value, specifically as follows:

ModeCategoryIdx=ModeIdx>>3. for blocksizeIdx=0
ModeCategoryIdx=(ModeIdx>>3)+1. for blocksizeIdx=1
ModeCategoryIdx=ModeIdx>>2. for blocksizeIdx=2

Optionally, the MIP mode category index value is determined according to the condition judgment. In some embodiments, the operation that the MIP mode category index value of the current block is determined according to the block size index value and the MIP mode index value may include the following operations.

When the block size index value is equal to 0, if the MIP mode index value is less than or equal to a first threshold value, it is determined that the MIP mode category index value is a fourth preset value, or, if the MIP mode index value is greater than the first threshold value, it is determined that the MIP mode category index value is a fifth preset value.

Or, when the block size index value is equal to 1, if the MIP mode index value is less than or equal to a second threshold value, it is determined that the MIP mode category index value is a sixth preset value; or, if the MIP mode index value is greater than the second threshold value, it is determined that the MIP mode category index value is a seventh preset value.

Or, when the block size index value is equal to 2, if the MIP mode index value is less than or equal to a third threshold value, it is determined that the MIP mode category index value) is an eighth preset value; if the MIP mode index value is greater than the third threshold value and the MIP mode index value is less than or equal to a fourth threshold value, it is determined that the MIP mode category index value is a ninth preset value; or, if the MIP mode index value is greater than the fourth threshold value, it is determined that the MIP mode category index value is a tenth preset value.

It is to be noted that the first threshold value may be 6, the second threshold value may be 8, the third threshold value may be 3, the fourth threshold value may be 4, the fourth preset value may be 5, the fifth preset value may be 6, the sixth preset value may be 6, the seventh preset value may be 7, the eighth preset value may be 5, the ninth preset value may be 6 and the tenth preset value may be 7.

Exemplarily, when the block size index value (blocksizeIdx) is equal to 0, if the MIP mode index value (modeIdx) is less than or equal to 6, the MIP mode category index value is set equal to 5, otherwise the MIP mode category index value is set equal to 6. When the block size index value (blocksizeIdx) is equal to 1, if the MIP mode index value (modeIdx) is less than or equal to 8, the MIP mode category index value is set equal to 6, otherwise the MIP mode category index value is set equal to 7. When the block size index value (blocksizeIdx) is equal to 2, if the MIP mode index value (modeIdx) is less than or equal to 3, the MIP mode category index value is set equal to 5: if the MIP mode index value (modeIdx) is less than or equal to 4, the MIP mode category index value is set equal to 6; otherwise the MIP mode category index value is equal to be 7, specifically as follows:

If ModeIdx<=6, ModeCategoryIdx=5, otherwise ModeCategoryIdx=6, for blocksizeIdx=0

If ModeIdx<=8, ModeCategoryIdx=6, otherwise ModeCategoryIdx=7, for blocksizeIdx=1

If ModeIdx<=3. ModeCategoryIdx=5, else if ModeIdx<=4, ModeCategoryIdx=6, otherwise ModeCategoryIdx=7, for blocksizeIdx=2

It is also to be noted that the first threshold value may be 6, the second threshold value may be 8, the third threshold value may be 3, the fourth threshold value may be 4, the fourth preset value may be 0, the fifth preset value may be 1, the sixth preset value may be 1, the seventh preset value may be 2, the eighth preset value may be 0, the ninth preset value may be 1 and the tenth preset value may be 2.

Exemplarily, when the block size index value (blocksizeIdx) is equal to 0, if the MIP mode index value (modeIdx) is less than or equal to 6, the MIP mode category index value is set equal to 0, otherwise the MIP mode category index value is set equal to 1. When the block size index value (blocksizeIdx) is equal to 1, if the MIP mode index value (modeIdx) is less than or equal to 8, the MIP mode category index value is set equal to 1, otherwise the MIP mode category index value is set equal to 2. When the block size index value (blocksizeIdx) is equal to 2, if the MIP mode index value (modeIdx) is less than or equal to 3, the MIP mode category index value is set equal to 0; if the MIP mode index value (modeIdx) is less than or equal to 4, the MIP mode category index value is set equal to 1; otherwise the MIP mode category index value is set equal to 2, specifically as follows:

If ModeIdx<=6, ModeCategoryIdx=, otherwise ModeCategoryIdx=1, for blocksizeIdx=0

If ModeIdx<=8, ModeCategoryIdx=1, otherwise ModeCategoryIdx=2, for blocksizeIdx=1

If ModeIdx<=3. ModeCategoryIdx=0, else if ModeIdx<=4, ModeCategoryIdx=, otherwise ModeCategotyIdx=2, for blocksizeIdx=2

In the above implementation mode, storage of a minimized LUT may be implemented by simplifying the determination manner for the shift factor, particularly minimizing the shift table, so that the memory occupied by storage of the shift table in the MIP mode may be reduced without increasing the calculation complexity.

Therefore, in the MIP mode, the MIP input sample matrix, the MIP weight matrix and the shift factor may be obtained to subsequently determine the intra prediction value of the current block.

In S303, the intra prediction value of the current block is determined according to the MIP weight matrix, the shift factor and the MIP input sample matrix.

It is to be noted that, after the MIP input sample matrix, the MIP weight matrix and the shift factor are obtained, the MIP-based prediction block of the current block may be determined at first and then the intra prediction value of the current block is determined. Specifically, in some embodiments, for S303, the operation that the intra prediction value of the current block is determined according to the MIP weight matrix, the shift factor and the MIP input sample matrix may include the following operations.

Matrix multiplication processing is performed on the MIP input sample matrix, the MIP weight matrix and the shift factor by use of a preset calculation model to obtain the MIP-based prediction block of the current block.

Filtering processing is performed on the MIP-based prediction block to obtain the intra prediction value of the current block, the MIP-based prediction block including prediction values of at least part of pixel positions in the current block.

That is, after the MIP input sample matrix, the MIP weight matrix and the shift factor are obtained, the MIP-based prediction block of the current block may be determined at first by use of the preset calculation model. The MIP-based prediction block includes prediction values of at least part of pixel positions in the current block.

Specifically, in the MIP mode, the MIP weight matrix (represented by mWeight), the shift factor (represented by sW) and an offset value (represented by fO) may be determined according to the block size index value (represented by blocksizeIdx) of the current block and the MIP mode index value (modeIdx). Then, the MIP input sample matrix (represented by P[x]), mWeight, sW and fO are input to the matrix multiplication process to obtain the MIP-based prediction block (represented by predMip[x][y]) output by matrix multiplication, and samples in predMip[x][y] are arranged in a matrix form according to predSizexpredSize. The calculation model is as follows:

$$\begin{cases} oW = (1 << (sW - 1)) - fO \times \left( \sum_{i=0}^{inSize-1} p[i] \right) \\ predMip[x][y] = \left( \left( \left( \sum_{i=0}^{inSize-1} mWeight[i] \right. \right. \right. \\ \left. \left. \left. [y \times [predSize + x] \times p[i]) + oW \right) >> sW \right) + pTemp[0] \end{cases} \quad (8)$$

[x][y] represents a position coordinate of a pixel, x representing a horizontal direction and y representing a vertical direction, inSize represents the number of the input samples, and predSize represents a side length of the MIP-based prediction block predMip. Here, predSize is correlated with the type mipSizeId of the current block only. When mipSizeId=0 or 1, the output MIP-based prediction block is 4×4, and predSize is equal to 4. When mipSizeId=2, the output MIP-based prediction block is 8×8, and predSize is equal to 8. Therefore, a temporary prediction value of at least one pixel in the MIP-based prediction block predMip may be calculated according to the equation (8) to obtain the MIP-based prediction block.

Furthermore, it is also necessary to perform embedding processing on a prediction sample value in the MIP-based prediction block to obtain the MIP-based prediction block of the current block. Then, whether to perform transposition processing on the MIP-based prediction block is judged. If a judgment result is YES, it is further necessary to perform transposition processing on the prediction sample value in the MIP-based prediction block, and the transposed MIP-based prediction block is determined as the MIP-based prediction block of the current block. If the judgment result is NO, it is unnecessary to perform transposition processing on the prediction sample value in the MIP-based prediction block, and the MIP-based prediction block may be directly determined as the MIP-based prediction block of the current block.

Furthermore, in some embodiments, the operation that filtering processing is performed on the MIP-based prediction block to obtain the intra prediction value of the current block may include the following operations.

Whether a size of the MIP-based prediction block is the same as the size of the current block is judged.

When the size of the MIP-based prediction block is the same as the size of the current block, an intra predicted block of the current block is set equal to the MIP-based prediction block, the MIP-based prediction block including prediction sample values of all pixel positions in the current block.

When the size of the MIP-based prediction block is different from the size of the current block, filtering processing is performed on the MIP-based prediction block to obtain a filtered prediction block, and the filtered prediction block is set as the intra prediction block of the current block.

Here, filtering processing may include up-sampling filtering processing or low-pass filtering processing.

It should be understood that, after the MIP-based prediction block is obtained, since the MIP-based prediction block may have two sizes: a 4×4 MIP-based prediction block and an 8×8 MIP-based prediction block, the size of the current block may be the same as or different from the size of the MIP-based prediction block. That is, the current block may not always be filled up with the sample values corresponding to the MIP-based prediction block and thus an up-sampling operation may be needed to be executed on the MIP-based prediction block to generate a final prediction value, namely whether the size of the MIP-based prediction block is the same as the size of the current block is judged to determine whether to perform up-sampling processing on the MIP-based prediction block.

It is to be noted that, when the size of the MIP-based prediction block is the same as the size of the current block, namely both a width and height of the MIP-based prediction block are the same as those of the current block, it is indicated that up-sampling processing is not required to be performed on the MIP-based prediction block. In such case, the current block is directly filled with the MIP-based prediction block, namely there are no vacant pixels in the filled current block, and an intra prediction value of each pixel in the current block may be directly set equal to a predicted value of each pixel in the MIP-based prediction block, as follows:

predSamples[x][y]=predMip[x][y]     (9)

[x][y] represents a position coordinate of a pixel, x representing the horizontal direction and y representing the vertical direction, predSamples[x][y] represents an intra prediction value corresponding to the pixel with the position coordinate [x][y] in the current block, and predMip[x][y] represents a prediction value corresponding to the pixel with the position coordinate [x][y] in the MIP-based prediction block. Therefore, the MIP-based prediction block predMip [x][y] may be directly determined as the intra prediction block predSamples[x][y] of the current block according to the equation (9).

It is also to be noted that, when the size of the MIP-based prediction block is different from the size of the current block, namely at least one of the width and height of the MIP-based prediction block is different from that of the current block, the current block may not be filled up with the MIP-based prediction block, namely there are vacant pixels in the filled current block. This indicates that filtering processing is needed to be performed on the MIP-based prediction block. That is, if up-sampling processing is needed to be performed in both the horizontal direction and the vertical direction, horizontal up-sampling may be performed on the MIP-based prediction block at first and then vertical up-sampling may be performed, so that a first up-sampled block, may be represented by predSamples[x][y], is obtained. Then, vertical up-sampling is performed on the MIP-based prediction block and then horizontal up-sampling is performed, so that a second up-sampled block, may be represented by predSamplesTemp[x][y], is obtained. Finally, weighted mean calculation is performed on predSamples[x][y] and predSamples[x][y] to finally obtain the intra predicted block of the current block.

Figure 4:
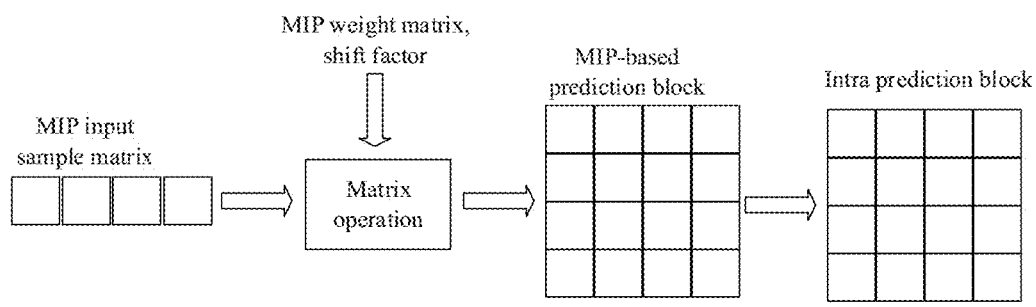
FIG. 4 is a structure diagram of generating an infra prediction value according to embodiments of the application.

Exemplarily, when side lengths nTbS (here, S may be represented by W and H respectively) of the current block are all equal to the side length predSize (here, predSize is correlated with blocksizeIdx of the current block only) of predMip, the MIP-based prediction block may be directly set as the intra predicted block of the current block, otherwise filtering processing is needed to be performed on the MIP-based prediction block to obtain the intra predicted block of the current block. A generation process of the intra prediction block may refer to FIG. 4. Still taking a 4×4 current block as an example, in FIG. 4, since the sizes of the current block and the MIP-based prediction block are the same, filtering processing is not needed to be performed on the MIP-based prediction block, and the MIP-based prediction block may be directly set as the intra prediction block of the current block, so that an intra prediction value of at least one pixel in the current block may be obtained.

The embodiment provides a method for colour component prediction, which is applicable for an encoder. Prediction parameters of a current block are determined, the prediction parameters including a prediction mode parameter and a size parameter of the current block. When the prediction mode parameter indicates that an MIP mode is adopted to determine an intra prediction value of the current block, an MIP weight matrix of the current block, a shift factor of the current block and an MIP input sample matrix of the current block are determined. The intra prediction value of the current block is determined according to the MIP weight matrix, the shift factor and the MIP input sample matrix. In such a manner, a determination manner for the shift factor may be simplified, and moreover, when the shift factor is determined by use of a LUT, a memory occupied by storage of the LUT may be reduced at the same time of reducing the calculation complexity to achieve a purpose of improving the encoding efficiency.

Figure 5:
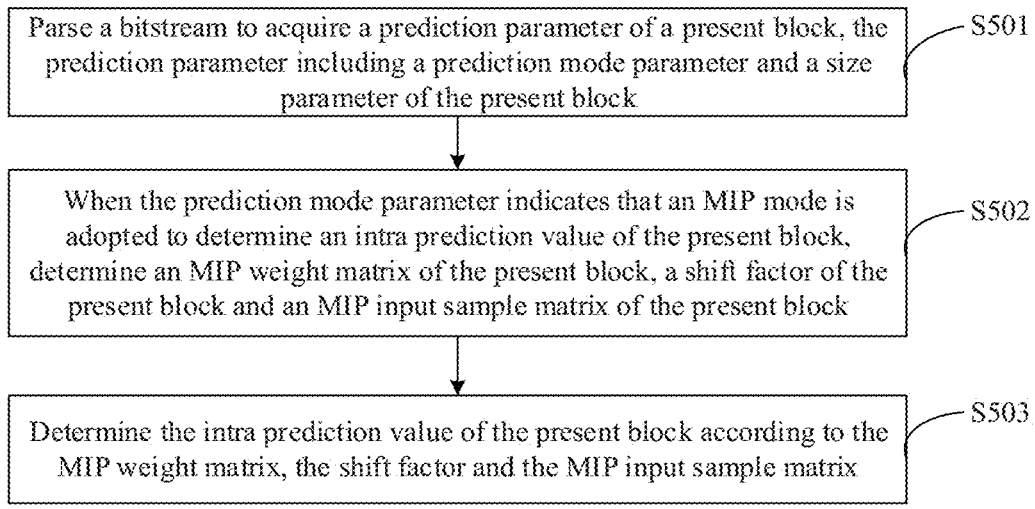
FIG. 5 is a flowchart of another method for colour component prediction according to embodiments of the application.

Based on the application scenario example shown in FIG. 2B, referring to FIG. 5, a flowchart of another method for colour component prediction according to embodiments of the application is shown. As shown in FIG. 5, the method may include the following operations.

In S501, a bitstream is parsed to acquire prediction parameters of a current block, the prediction parameters including a prediction mode parameter and a size parameter of the current block.

It is to be noted that the method is applicable for a decoder. A video signal may be divided into multiple blocks. Each current to-be-decoded picture block may be called a decoding block. Here, each decoding block may include a first colour component, a second colour component and a third colour component. The current block is a to-be-decoded block, of which the first colour component, second colour component and third colour component are presently to be predicted, in the video signal.

It is also to be noted that the prediction parameter is configured to indicate a prediction mode for the current block and parameters related to the prediction mode. The prediction mode usually includes an inter prediction mode, a conventional intra prediction mode and an unconventional intra prediction mode, etc. The unconventional intra prediction mode further includes an MIP mode, a CCLM mode, an IBC mode and a PLT mode, etc. That is, an encoder may select an optimal prediction mode to precode the current block, and in this process, the prediction mode for the current block may be determined, thereby writing prediction parameters in the prediction mode into the bitstream for transmission to the decoder by the encoder.

Therefore, on a decoder side, the bitstream may be parsed to acquire the prediction parameters of the current block, and the prediction mode parameter in the prediction parameters acquired by parsing may be configured to determine whether the MIP mode is adopted for the current block.

In S502, when the prediction mode parameter indicates that an MIP mode is adopted to determine an intra prediction value of the current block, an MIP weight matrix of the current block, a shift factor of the current block and an MIP input sample matrix of the current block are determined.

It is to be noted that, for the current block, if the MIP mode is adopted for the current block to determine the intra prediction value of the current block, the MIP input sample matrix of the current block, the MIP weight matrix of the current block and the shift factor of the current block are needed to be determined. The shift factor may also be called a shifted bit number, a weight shift value and the like, and may be represented by sW, shift or weight shift.

In some embodiments, the shift factor of the current block may include a constant shift factor or a shift factor determined according to the prediction parameter.

In a possible implementation mode, the shift factor may be set equal to a fixed constant value. In the embodiment of the application, a value of the constant shift factor is preferably equal to 6, but no specific limits are made thereto.

In another possible implementation mode, the operation that the shift factor is determined according to the prediction parameter may include the following operations.

A block size index value of the current block is determined according to the size parameter of the current block.

The shift factor is determined according to the block size index value of the current block.

It is to be noted that the block size index value (represented by mipSizeId or blocksizeIdx) of the current block may be determined according to the size parameter of the current block. Specifically, the operation that the block size index value of the current block is determined according to the size parameter of the current block may include the following operations.

When both a width and height of the current block are equal to 4, the block size index value of the current block is set equal to 0.

When both the width and height of the current block are equal to 8 or one of the width and height of the current block is equal to 4, the block size index value of the current block is set equal to 1.

When both the width and height of the current block do not meet the above conditions, the block size index value of the current block is set equal to 2.

In such a manner, after the block size index value of the current block is determined, the shift factor may further be determined according to the block size index value of the current block in combination with the number of MIP input sample values or a size of an MIP-based prediction block.

Optionally, in some embodiments, the operation that the shift factor is determined according to the block size index value of the current block may include the following operation.

The shift factor is set equal to a ratio of the width or height of the current block to a first preset value corresponding to the block size index value of the current block.

Here, the first preset value represents the number of MIP input sample values obtained from a boundary of the current block. In such case, the method may further include the following operation.

When the block size index value of the current block is equal to 0, 1 and 2 respectively, it is determined that the first preset value corresponding to the block size index value of the current block is equal to 2, 4 and 4 respectively.

That is, when the first preset value represents the number of the MIP input sample values obtained from the boundary of the current block, if the block size index value of the current block is equal to 0, the corresponding first preset value is equal to 2; if the block size index value of the current block is equal to 1, the corresponding first preset value is equal to 4: and if the block size index value of the current block is equal to 2, the corresponding first preset value is equal to 4. Therefore, the shift factor may be determined according to the ratio of the width or height of the current block to the corresponding first preset value.

Optionally, in some embodiments, the operation that the shift factor is determined according to the block size index value of the current block may include the following operation.

The shift factor is set equal to a ratio of the width or height of the current block to a second preset value corresponding to the block size index value of the current block.

Here, the second preset value represents the size of the MIP-based prediction block, obtained by direct use of the MIP weight matrix, of the current block. In such case, the method may further include the following operation.

When the block size index value of the current block is equal to 0, 1 and 2 respectively, it is determined that the second preset value corresponding to the block size index value of the current block is equal to 4, 4 and 8 respectively.

That is, when the second preset value represents the size of the MIP-based prediction block, obtained by direct use of the MIP weight matrix, of the current block, if the block size index value of the current block is equal to 0, the corresponding second preset value is equal to 4; if the block size index value of the current block is equal to 1, the corresponding second preset value is equal to 4; and if the block size index value of the current block is equal to 2, the corresponding second preset value is equal to 8. Therefore, the shift factor may be determined according to the ratio of the width or height of the current block to the corresponding second preset value.

In another possible implementation mode, a shift table may be minimized, and the shift factor is still determined in a table lookup manner. Optionally, in some embodiments, for S502, the method further includes the following operations.

The block size index value of the current block is determined according to the size parameter of the current block.

A shift factor corresponding to the determined block size index value is queried in a first preset LUT according to the determined block size index value, the first preset LUT being configured to record corresponding values of the block size index values and the shift factors.

The queried shift factor is determined as the shift factor of the current block.

It is to be noted that the shift table (for example, the first preset LUT or a second preset LUT) is also pre-created in the decoder and the shift table is also stored in the decoder. Therefore, when the shift factor is queried according to the block size index value of the current block only, the first preset LUT shown as Table 5 may be adopted. In Table 5, each block size index value may correspond to a fixed shift factor. That is, there is a fixed shift value shown in Table 5 for a size of each block or a size set of each block.

In another possible implementation mode, the shift table may also be minimized, and the shift factor is still determined in the table lookup manner. Optionally, in some embodiments, for S502, the method may further include the following operations.

When the prediction mode parameter indicates that the MIP mode is adopted to determine the intra prediction value of the current block, an MIP mode category index value of the current block is determined.

A shift factor corresponding to the determined MIP mode category index value is queried in a second preset LUT according to the determined MIP mode category index value, the second preset LUT being configured to record corresponding values of the MIP mode category index values and the shift factors.

The queried shift factor is determined as the shift factor of the current block.

It is to be noted that, when the shift factor is queried according to the MIP mode category index value (represented by ModeCategoryIdx) of the current block only, the second preset LUT shown as Table 6 may be adopted. In Table 6, each MIP mode category index value may correspond to a fixed shift factor. That is, a fixed shift value shown in Table 6 may be executed according to ModeCategoryIdx.

Furthermore, ModeCategoryIdx may be deduced according to the MIP mode index value. Specifically, the operation that the MIP mode category index value of the current block is determined may include the following operations.

The block size index value corresponding to the current block and the MIP mode index value when the MIP mode is adopted for prediction are determined according to the prediction parameter.

The MIP mode category index value of the current block is determined according to the block size index value and the MIP mode index value.

That is, after the block size index value of the current block and the MIP mode index value are obtained, the MIP mode category index value may be calculated in a hash manner, or the MIP mode category index value may also be determined according to a condition judgment.

Optionally, the MIP mode category index value is calculated in the hash manner. In some embodiments, the operation that the MIP mode category index value of the current block is determined according to the block size index value and the MIP mode index value includes the following operations.

When the block size index value is equal to 0, right shift processing is performed on the MIP mode index value by use of a first preset shift value to obtain the MIP mode category index value of the current block.

Or, when the block size index value is equal to 1, right shift processing is performed on the MIP mode index value by use of the first preset shift value to obtain a right-shifted value, and superimposition processing is performed on the right-shifted value and a third preset value to obtain the MIP mode category index value of the current block.

Or, when the block size index value is equal to 2, right shift processing is performed on the MIP mode index value by use of a second preset shift value to obtain the MIP mode category index value of the current block.

Exemplarily, the first preset shift value may be 3, the second preset shift value may be 2 and the third preset value may be 1, specifically as follows:

ModeCategoryIdx=ModeIdx>>3. for blocksizeIdx=0
ModeCategoryIdx=(ModeIdx>>3)+1. for blocksizeIdx=1
ModeCategoryIdx=ModeIdx>>2. for blocksizeIdx=2

Optionally, the MIP mode category index value is determined according to the condition judgment. In some embodiments, the operation that the MIP mode category index value of the current block is determined according to the block size index value and the MIP mode index value includes the following operations.

When the block size index value is equal to 0, if the MIP mode index value is less than or equal to a first threshold value, it is determined that the MIP mode category index value is a fourth preset value; if the MIP mode index value is greater than the first threshold value, it is determined that the MIP mode category index value is a fifth preset value.

Or, when the block size index value is equal to 1, if the MIP mode index value is less than or equal to a second threshold value, it is determined that the MIP mode category index value is a sixth preset value; if the MIP mode index value is greater than the second threshold value, it is determined that the MIP mode category index value is a seventh preset value.

Or, when the block size index value is equal to 2, if the MIP mode index value is less than or equal to a third threshold value, it is determined that the MIP mode category index value is an eighth preset value; if the MIP mode index value is greater than the third threshold value and the MIP mode index value is less than or equal to a fourth threshold value, it is determined that the MIP mode category index value is a ninth preset value; if the MIP mode index value is greater than the fourth threshold value, it is determined that the MIP mode category index value is a tenth preset value.

Exemplarily, the first threshold value may be 6, the second threshold value may be 8, the third threshold value may be 3 and the fourth threshold value may be 4.

When the fourth preset value may be 5, the fifth preset value may be 6, the sixth preset value may be 6, the seventh preset value may be 7, the eighth preset value may be 5, the ninth preset value may be 6 and the tenth preset value is 7, specific representations are as follows:

If ModeIdx<=6, ModeCategoryIdx=5, otherwise ModeCategoryIdx=6, for blocksizeIdx=0

If ModeIdx<=8, ModeCategoryIdx=6, otherwise ModeCategoryIdx=7, for blocksizeIdx=1

If ModeIdx<=3, ModeCategoryIdx=5, else if ModeIdx<=4, ModeCategoryIdx=6, otherwise ModeCategoryIdx=7, for blocksizeIdx=2

Or, when the fourth preset value may be 0, the fifth preset value may be 1, the sixth preset value may be 1, the seventh preset value may be 2, the eighth preset value may be 0, the ninth preset value may be 1 and the tenth preset value is 2, specific representations are as follows:

If ModeIdx<=6, ModeCategoryIdx=0, otherwise ModeCategoryIdx=1, for blocksizeIdx=0

If ModeIdx<=8, ModeCategoryIdx=1, otherwise ModeCategoryIdx=2, for blocksizeIdx=1

If ModeIdx<=3, ModeCategoryIdx=0, else if ModeIdx<=4. ModeCategoryIdx=1, otherwise ModeCategoryIdx=2, for blocksizeIdx=2

In the implementation mode, storage of a minimized LUT may be implemented by simplifying the determination manner for the shift factor, particularly by minimizing the shift table, so that the memory occupied by storage of the shift table in the MIP mode may be reduced without increasing the calculation complexity.

Therefore, in the MIP mode, the MIP input sample matrix and the MIP weight matrix may also be obtained to subsequently determine the intra prediction value of the current block.

In S503, the intra prediction value of the current block is determined according to the MIP weight matrix, the shift factor and the MIP input sample matrix.

It is to be noted that, after the MIP input sample matrix, the MIP weight matrix and the shift factor are obtained, the MIP-based prediction block of the current block may be determined at first and then the intra prediction value of the current block is determined. Specifically, in some embodiments, for S503, the operation that the intra prediction value of the current block is determined according to the MIP weight matrix, the shift factor and the MIP input sample matrix may include the following operations.

Matrix multiplication processing is performed on the MIP input sample matrix, the MIP weight matrix and the shift factor by use of a preset calculation model to obtain the MIP-based prediction block of the current block.

Filtering processing is performed on the MIP-based prediction block to obtain the intra prediction value of the current block, the MIP-based prediction block including prediction values of at least part of pixel positions in the current block.

That is, after the MIP input sample matrix, the MIP weight matrix and the shift factor are obtained, the MIP-based prediction block of the current block may be determined at first, and then whether the size of the MIP-based prediction block is the same as the size of the current block may further be determined according to the obtained MIP-based prediction block to further determine the intra prediction value of the current block. Specifically, according to a judgment result, when the size of the MIP-based prediction block is the same as the size of the current block, an intra prediction block of the current block is set equal to the MIP-based prediction block, and in such case, the MIP-based prediction block includes prediction sample values of all pixel positions in the current block. When the size of the MIP-based prediction block is different from the size of the current block, filtering processing is performed on the MIP-based prediction block to obtain a filtered prediction block, and the filtered prediction block is set as the intra prediction block of the current block. Here, filtering processing may include up-sampling filtering processing or low-pass filtering processing.

The embodiment provides a method for colour component prediction, which is applicable for a decoder. A bitstream is parsed to acquire prediction parameters of a current block, the prediction parameters including a prediction mode parameter and a size parameter of the current block; when the prediction mode parameter indicates that an MIP mode is adopted to determine an intra prediction value of the current block, an MIP weight matrix of the current block, a shift factor of the current block and an MIP input sample matrix of the current block are determined; and the intra prediction value of the current block is determined according to the MIP weight matrix, the shift factor and the MIP input sample matrix. In such a manner, a determination manner for the shift factor may be simplified, and moreover, when the shift factor is determined by use of a LUT, a memory occupied by storage of the LUT may be reduced at the same time of reducing the calculation complexity to achieve a purpose of improving the decoding efficiency.

Figure 6:
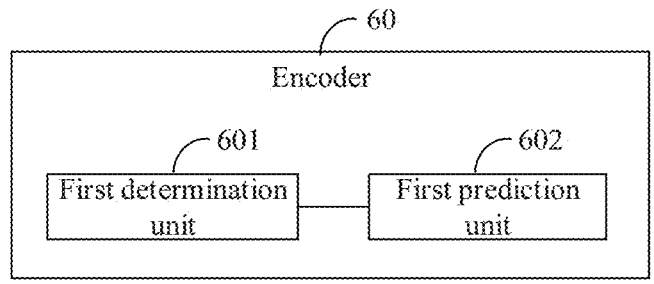
FIG. 6 is a composition structure diagram of an encoder according to embodiments of the application.

Based on the same inventive concept of the abovementioned embodiments, referring to FIG. 6, a composition structure diagram of an encoder 60 according to embodiments of the application is shown. As shown in FIG. 6, the encoder 60 may include a first determination unit 601 and a first prediction unit 602.

The first determination unit 601 is configured to determine prediction parameters of a current block, the prediction parameters including a prediction mode parameter and a size parameter of the current block.

The first determination unit 601 is further configured to, when the prediction mode parameter indicates that an MIP mode is adopted to determine an intra prediction value of the current block, determine an MIP weight matrix of the current block, a shift factor of the current block and an MIP input sample matrix of the current block.

The first prediction unit 602 is configured to determine the intra prediction value of the current block according to the MIP weight matrix, the shift factor and the MIP input sample matrix.

In some embodiments, the shift factor of the current block includes a constant shift factor or a shift factor determined according to the prediction parameter.

In some embodiments, a value of the constant shift factor is equal to 6.

In some embodiments, the first determination unit 601 is further configured to determine a block size index value of the current block according to the size parameter of the current block and determine the shift factor according to the block size index value of the current block.

Figure 7:
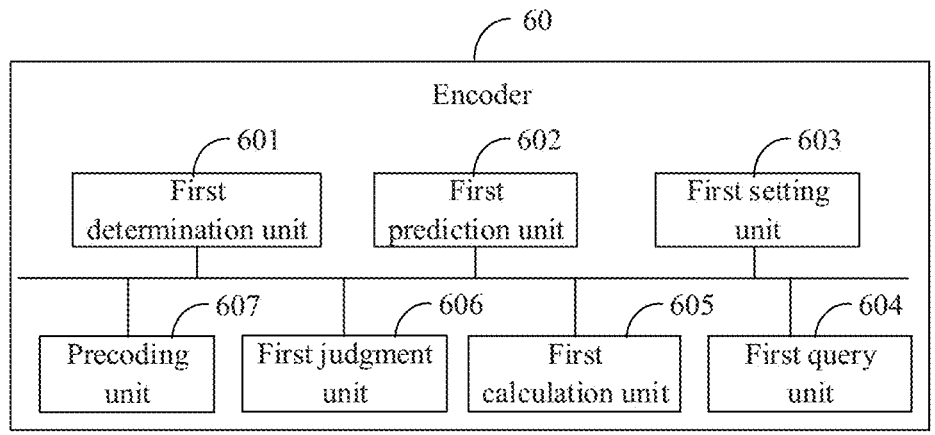
FIG. 7 is a composition structure diagram of another encoder according to embodiments of the application.

In some embodiments, referring to FIG. 7, the encoder 60 may further include a first setting unit 603, configured to set the block size index value of the current block equal to 0 when both a width and height of the current block are equal to 4; set the block size index value of the current block equal to 1 when both the width and height of the current block are equal to 8 or one of the width and height of the current block is equal to 4: and set the block size index value of the current block equal to 2 when the width and height of the current block do not meet the above conditions.

In some embodiments, the first setting unit 603 is further configured to set the shift factor equal to a ratio of the width or height of the current block to a first preset value corresponding to the block size index value of the current block.

In some embodiments, the first preset value represents the number of MIP input sample values obtained from a boundary of the current block.

In some embodiments, the first determination unit 601 is further configured to, when the block size index value of the current block is equal to 0, 1 and 2 respectively, determine that the first preset value corresponding to the block size index value of the current block is equal to 2, 4 and 4 respectively.

In some embodiments, the first setting unit 603 is further configured to set the shift factor equal to a ratio of the width or height of the current block to a second preset value corresponding to the block size index value of the current block.

In some embodiments, the second preset value represents a size of an MIP-based prediction block, obtained by direct use of the MIP weight matrix, of the current block.

In some embodiments, the first determination unit 601 is further configured to, when the block size index value of the current block is equal to 0, 1 and 2 respectively, determine that the second preset value corresponding to the block size index value of the current block is equal to 4, 4 and 8 respectively.

In some embodiments, referring to FIG. 7, the encoder 60 may further include a first query unit 604.

The first determination unit 601 is further configured to determine the block size index value of the current block according to the size parameter of the current block.

The first query unit 604 is configured to query a shift factor corresponding to the determined block size index value in a first preset LUT according to the determined block size index value, the first preset LUT being configured to record corresponding values of the block size index values and the shift factors, and determine the queried shift factor as the shift factor corresponding to the current block.

In some embodiments, the first determination unit 601 is further configured to, when the prediction mode parameter indicates that the MIP mode is adopted to determine the intra prediction value of the current block, determine an MIP mode category index value of the current block.

The first query unit 604 is configured to query a shift factor corresponding to the determined MIP mode category index value in a second preset LUT according to the determined MIP mode category index value, the second preset LUT being configured to record corresponding values of the MIP mode category index values and the shift factors, and determine the queried shift factor as the shift factor corresponding to the current block.

In some embodiments, the first determination unit 601 is specifically configured to determine the block size index value corresponding to the current block and an MIP mode index value when the MIP mode is adopted for prediction and determine the MIP mode category index value of the current block according to the block size index value and the MIP mode index value.

In some embodiments, referring to FIG. 7, the encoder 60 may further include a first calculation unit 605. The first calculation unit 605 is configured to, when the block size index value is equal to 0, perform right shift processing on the MIP mode index value by use of a first preset shift value to obtain the MIP mode category index value of the current block; or, when the block size index value is equal to 1, perform right shift processing on the MIP mode index value by use of the first preset shift value to obtain a right-shifted value and perform superimposition processing on the right-shifted value and a third preset value to obtain the MIP mode category index value of the current block; or, when the block size index value is equal to 2, perform right shift processing on the MIP mode index value by use of a second preset shift value to obtain the MIP mode category index value of the current block.

In some embodiments, referring to FIG. 7, the encoder 60 may further include a first judgment unit 606. The first judgment unit 606 is configured to, when the block size index value is equal to 0, if the MIP mode index value is less than or equal to a first threshold value, determine that the MIP mode category index value is a fourth preset value, and if the MIP mode index value is greater than the first threshold value, determine that the MIP mode category index value is a fifth preset value; or, when the block size index value is equal to 1, if the MIP mode index value is less than or equal to a second threshold value, determine that the MIP mode category index value is a sixth preset value, and if the MIP mode index value is greater than the second threshold value, determine that the MIP mode category index value is a seventh preset value; or, when the block size index value is equal to 2, if the MIP mode index value is less than or equal to a third threshold value, determine that the MIP mode category index value is an eighth preset value, if the MIP mode index value is greater than the third threshold value and the MIP mode index value is less than or equal to a fourth threshold value, determine that the MIP mode category index value is a ninth preset value, and if the MIP mode index value is greater than the fourth threshold value, determine that the MIP mode category index value is a tenth preset value.

In some embodiments, referring to FIG. 7, the encoder 60 may further include a precoding unit 607, configured to perform precoding processing on the current block in multiple prediction modes to obtain rate distortion cost values corresponding to all prediction modes, select a minimum rate distortion cost value from the obtained multiple rate distortion cost values and determine prediction parameters in the prediction mode corresponding to the minimum rate distortion cost value as the prediction parameters of the current block.

In some embodiments, the first calculation unit 605 is further configured to perform matrix multiplication processing on the MIP input sample matrix, the MIP weight matrix and the shift factor by use of a preset calculation model to obtain the MIP-based prediction block of the current block.

The first prediction unit 602 is specifically configured to perform filtering processing on the MIP-based prediction block to obtain the intra prediction value of the current block, the MIP-based prediction block including predicted values of at least part of pixel positions in the current block.

It can be understood that, in the embodiments of the application, "unit" may be part of a circuit, part of a processor, part of a program or software and the like, of course, may also be modular and may also be non-modular. In addition, each component in the embodiments may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a Read-Only Memory (ROM), a Random Access Memory (RAM), a magnetic disk or an optical disk.

Therefore, the embodiments of the application provide a computer storage medium, which is applicable for the encoder 60. The computer storage medium stores computer programs, and the computer programs are executed by a first processor to implement any method in the abovementioned embodiments.

Figure 8:
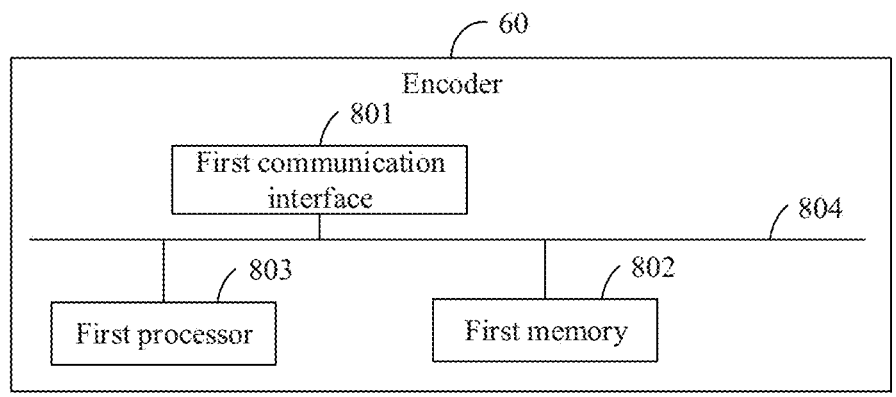
FIG. 8 is a specific hardware structure diagram of an encoder according to embodiments of the application.

Based on the composition of the encoder 60 and the computer storage medium, referring to FIG. 8, a specific hardware structure example of the encoder 60 according to the embodiments of the application is shown, and may include a first communication interface 801, a first memory 802 and a first processor 803. Each component is coupled together through a first bus system 804. It can be understood that the first bus system 804 is configured to implement connection communication between these components. The first bus system 804 includes a data bus and also includes a power bus, a control bus and a state signal bus. However, for clear description, various buses in FIG. 8 are marked as the first bus system 804.

The first communication interface 801 is configured to receive and send a signal in a process of receiving and sending information with other external network elements.

The first memory 802 is configured to store computer programs capable of running in the first processor 803.

The first processor 803 is configured to run the computer programs to execute the following operations.

Prediction parameters of a current block are determined, the prediction parameters including a prediction mode parameter and a size parameter of the current block.

When the prediction mode parameter indicates that an MIP mode is adopted to determine an intra prediction value of the current block, an MIP weight matrix of the current block, a shift factor of the current block and an MIP input sample matrix of the current block are determined.

The intra prediction value of the current block is determined according to the MIP weight matrix, the shift factor and the MIP input sample matrix.

It can be understood that the first memory 802 in the embodiments of the application may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed buffer. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the first memory 802 of a system and method described in the application is intended to include, but not limited to, memories of these and any other proper types.

The first processor 803 may be an integrated circuit chip with a signal processing capability. In an implementation process, each step of the method may be completed by an integrated logic circuit of hardware in the first processor 803 or an instruction in a software form. The first processor 803 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiments of the application may be implemented or executed. The universal processor may be a microprocessor or the processor may also be any conventional processor and the like. The operations of the method disclosed in combination with the embodiments of the application may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 802. The first processor 803 reads information in the first memory 802 and completes the operations of the method in combination with hardware.

It can be understood that these embodiments described in the application may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the application or combinations thereof. In case of implementation with the software, the technology of the application may be implemented through the modules (for example, processes and functions) executing the functions in the application. A software code may be stored in the memory and executed by the processor. The memory may be implemented in the processor or outside the processor.

Optionally, as another embodiment, the first processor 803 is further configured to run the computer programs to execute any method in the abovementioned embodiments.

The embodiments of the application provide an encoder. The encoder may include a first determination unit and a first prediction unit. The first determination unit is configured to determine prediction parameters of a current block, the prediction parameters including a prediction mode parameter and a size parameter of the current block. The first determination unit is further configured to, when the prediction mode parameter indicates that an MIP mode is adopted to determine an intra prediction value of the current block, determine an MIP weight matrix of the current block, a shift factor of the current block and an MIP input sample matrix of the current block. The first prediction unit is configured to determine the intra prediction value of the current block according to the MIP weight matrix, the shift factor and the MIP input sample matrix. In such a manner, a determination manner for the shift factor may be simplified, and moreover, when the shift factor is determined by use of a LUT, a memory occupied by storage of the LUT may be reduced at the same time of reducing the calculation complexity to achieve a purpose of improving the encoding and decoding efficiency.

Figure 9:
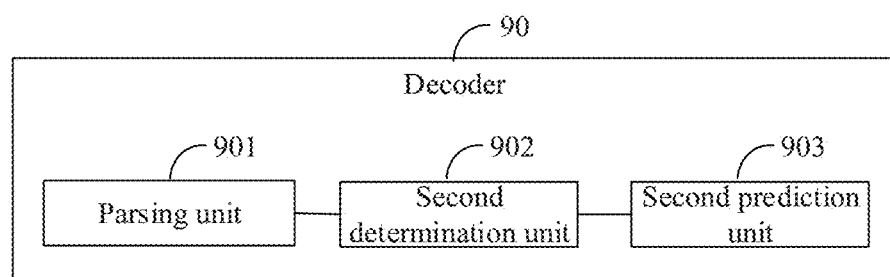
FIG. 9 is a composition structure diagram of a decoder according to embodiments of the application.

Based on the same inventive concept of the abovementioned embodiments, referring to FIG. 9, a composition structure diagram of a decoder 90 according to embodiments of the application is shown. As shown in FIG. 9, the decoder 90 may include a parsing unit 901, a second determination unit 902 and a second prediction unit 903.

The parsing unit 901 is configured to parse a bitstream to acquire prediction parameters of a current block, the prediction parameters including a prediction mode parameter and a size parameter of the current block.

The second determination unit 902 is configured to, when the prediction mode parameter indicates that an MIP mode is adopted to determine an intra prediction value of the current block, determine an MIP weight matrix of the current block, a shift factor of the current block and an MIP input sample matrix of the current block.

The second prediction unit 903 is configured to determine the intra prediction value of the current block according to the MIP weight matrix, the shift factor and the MIP input sample matrix.

In some embodiments, the shift factor of the current block includes a constant shift factor or a shift factor determined according to the prediction parameters.

In some embodiments, a value of the constant shift factor is equal to 6.

In some embodiments, the second determination unit 902 is further configured to determine a block size index value of the current block according to the size parameter of the current block and determine the shift factor according to the block size index value of the current block.

Figure 10:
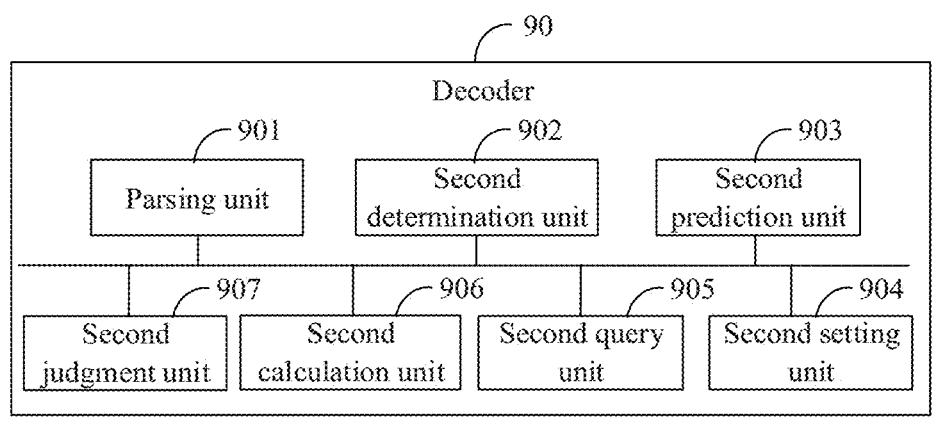
FIG. 10 is a composition structure diagram of a decoder according to embodiments of the application.

In some embodiments, referring to FIG. 10, the decoder 90 may further include a second setting unit 904. The second setting unit 904 is configured to, when both a width and height of the current block are equal to 4, set the block size index value of the current block equal to 0, when both the width and height of the current block are equal to 8 or one of the width and height of the current block is equal to 4, set the block size index value of the current block equal to 1; and when the width and height of the current block do not meet the above conditions, set the block size index value of the current block equal to 2.

In some embodiments, the second setting unit 904 is further configured to set the shift factor equal to a ratio of the width or height of the current block to a first preset value corresponding to the block size index value of the current block.

In some embodiments, the first preset value represents the number of MIP input sample values obtained from a boundary of the current block.

In some embodiments, the second determination unit 902 is further configured to, when the block size index value of the current block is equal to 0, 1 and 2 respectively determine that the first preset value corresponding to the block size index value of the current block is equal to 2, 4 and 4 respectively.

In some embodiments, the second setting unit 904 is further configured to set the shift factor equal to a ratio of the width or height of the current block to a second preset value corresponding to the block size index value of the current block.

In some embodiments, the second preset value represents a size of an MIP-based prediction block, obtained by direct use of the MIP weight matrix, of the current block.

In some embodiments, the second determination unit 902 is further configured to, when the block size index value of the current block is equal to 0, 1 and 2 respectively determine that the second preset value corresponding to the block size index value of the current block is equal to 4, 4 and 8 respectively.

In some embodiments, referring to FIG. 10, the decoder 90 may further include a second query unit 905.

The second determination unit 902 is further configured to determine the block size index value of the current block according to the size parameter of the current block.

The second query unit 905 is configured to query a shift factor corresponding to the determined block size index value in a first preset LUT according to the determined block size index value, the first preset LUT being configured to record corresponding values of the block size index values and the shift factors, and determine the queried shift factor as the shift factor corresponding to the current block.

In some embodiments, the second determination unit 902 is further configured to, when the prediction mode parameter indicates that the MIP mode is adopted to determine the intra prediction value of the current block, determine an MIP mode category index value of the current block.

The second query unit 905 is configured to query a shift factor corresponding to the determined MIP mode category index value in a second preset LUT according to the determined MIP mode category index value, the second preset LUT being configured to record corresponding values of the MIP mode category index values and the shift factors, and determine the queried shift factor as the shift factor corresponding to the current block.

In some embodiments, the second determination unit 902 is specifically configured to determine the block size index value corresponding to the current block and an MIP mode index value when the MIP mode is adopted for prediction according to the prediction parameter and determine the MIP mode category index value of the current block according to the block size index value and the MIP mode index value.

In some embodiments, referring to FIG. 10, the decoder 90 may further include a second calculation unit 906. The second calculation unit 906 is configured to, when the block size index value is equal to 0, perform right shift processing on the MIP mode index value by use of a first preset shift value to obtain the MIP mode category index value of the current block; or, when the block size index value is equal to 1, perform right shift processing on the MIP mode index value by use of the first preset shift value to obtain a right-shifted value and perform superimposition processing on the right-shifted value and a third preset value to obtain the MIP mode category index value of the current block; or, when the block size index value is equal to 2, perform right shift processing on the MIP mode index value by use of a second preset shift value to obtain the MIP mode category index value of the current block.

In some embodiments, referring to FIG. 10, the decoder 90 may further include a second judgment unit 907, configured to, when the block size index value is equal to 0, if the MIP mode index value is less than or equal to a first threshold value, determine that the MIP mode category index value is a fourth preset value, and if the MIP mode index value is greater than the first threshold value, determine that the MIP mode category index value is a fifth preset value; or, when the block size index value is equal to 1, if the MIP mode index value is less than or equal to a second threshold value, determine that the MIP mode category index value is a sixth preset value, and if the MIP mode index value is greater than the second threshold value, determine that the MIP mode category index value is a seventh preset value, or, when the block size index value is equal to 2, if the MIP mode index value is less than or equal to a third threshold value, determine that the MIP mode category index value is an eighth preset value, if the MIP mode index value is greater than the third threshold value and the MIP mode index value is less than or equal to a fourth threshold value, determine that the MIP mode category index value is a ninth preset value, and if the MIP mode index value is greater than the fourth threshold value, determine that the MIP mode category index value is a tenth preset value.

In some embodiments, the second calculation unit 906 is further configured to perform matrix multiplication processing on the MIP input sample matrix, the MIP weight matrix and the shift factor by use of a preset calculation model to obtain the MIP-based prediction block of the current block.

The second prediction unit 903 is specifically configured to perform filtering processing on the MIP-based prediction block to obtain the intra prediction value of the current block, the MIP-based prediction block including predicted values of at least part of pixel positions in the current block.

It can be understood that, in the embodiment, "unit" may be part of a circuit, part of a processor, part of a program or software and the like, of course, may also be modular and may also be non-modular. In addition, each component in the embodiments may be integrated into a processing unit, each unit may also exist independently, and two or more than two units may also be integrated into a unit. The integrated unit may be implemented in a hardware form and may also be implemented in form of software function module.

When being implemented in form of a software functional module and sold or used not as an independent product, the integrated unit may be stored in a computer-readable storage medium. Based on such an understanding, the embodiments provide a computer storage medium, which is applicable for the decoder 90. The computer storage medium stores computer programs, and the computer programs are executed by a second processor to implement any method in the abovementioned embodiments.

Figure 11:
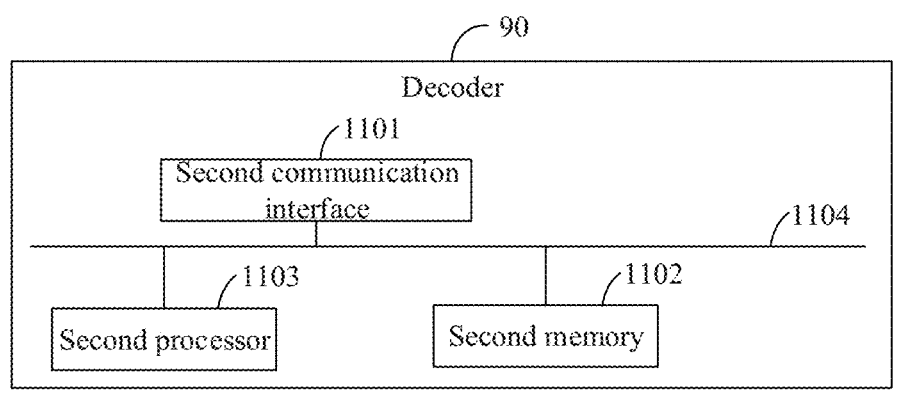
FIG. 11 is a specific hardware structure diagram of a decoder according to embodiments of the application.

Based on the composition of the decoder 90 and the computer storage medium, referring to FIG. 11, a specific hardware structure example of the decoder 90 according to the embodiments of the application is shown, and may include a second communication interface 1101, a second memory 1102 and a second processor 1103. Each component is coupled together through a second bus system 1104. It can be understood that the second bus system 1104 is configured to implement connection communication between these components. The second bus system 1104 includes a data bus and also includes a power bus, a control bus and a state signal bus. However, for clear description, various buses in FIG. 11 are marked as the second bus system 1104.

The second communication interface 1101 is configured to receive and send a signal in a process of receiving and sending information with another external network element.

The second memory 1102 is configured to store computer programs capable of running in the second processor 1103.

The second processor 1103 is configured to run the computer programs to execute the following operations.

A bitstream is parsed to acquire prediction parameters of a current block, the prediction parameters including a prediction mode parameter and a size parameter of the current block.

When the prediction mode parameter indicates that an MIP mode is adopted to determine an intra prediction value of the current block, an MIP weight matrix of the current block, a shift factor of the current block and an MIP input sample matrix of the current block are determined.

The intra prediction value of the current block is determined according to the MIP weight matrix, the shift factor and the MIP input sample matrix.

Optionally, as another embodiment, the second processor 1103 is further configured to run the computer programs to execute any method in the abovementioned embodiments.

It can be understood that the second memory 1102 has a hardware function similar to that of the first memory 802 and the second processor 1103 has a hardware function similar to that of the first processor 803. Elaborations are omitted herein.

The embodiments of the application provide a decoder. The decoder may include a parsing unit, a second determination unit and a second prediction unit. The parsing unit is configured to parse a bitstream to acquire prediction parameters of a current block, the prediction parameters including a prediction mode parameter and a size parameter of the current block. The second determination unit is configured to, when the prediction mode parameter indicates that an MIP mode is adopted to determine an intra prediction value of the current block, determine an MIP weight matrix of the current block, a shift factor of the current block and an MIP input sample matrix of the current block. The second prediction unit is configured to determine the intra prediction value of the current block according to the MIP weight matrix, the shift factor and the MIP input sample matrix. In such a manner, a determination manner for the shift factor may be simplified, and moreover, when the shift factor is determined by use of a LUT, a memory occupied by storage of the LUT may be reduced at the same time of reducing the calculation complexity, so that a purpose of improving the encoding and decoding efficiency is achieved.

It is to be noted that, in the application, terms "include" and "contain" or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the application are adopted not to represent superiority-inferiority of the embodiments but only for description.

The methods disclosed in some method embodiments provided in the application may be freely combined without conflicts to obtain new method embodiments.

The characteristics disclosed in some product embodiments provided in the application may be freely combined without conflicts to obtain new product embodiments.

The characteristics disclosed in some method or device embodiments provided in the application may be freely combined without conflicts to obtain new method embodiments or device embodiments.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

INDUSTRIAL APPLICABILITY

The embodiments of the application are applicable for to an encoder or a decoder. After prediction parameters of a current block are obtained, when a prediction mode parameter in the prediction parameters indicates that an MIP mode is adopted to determine an intra prediction value of the current block, an MIP weight matrix of the current block, a shift factor of the current block and an MIP input sample matrix of the current block may be determined, and then the intra prediction value of the current block is determined according to the MIP weight matrix, the shift factor and the MIP input sample matrix. In such a manner, on either a decoder side or an encoder side, a determination manner for the shift factor may be simplified, and moreover, when the shift factor is determined by use of a LUT, a memory occupied by storage of a LUT may be reduced at the same time of reducing the calculation complexity, so that a purpose of improving the encoding and decoding efficiency is achieved.

The invention claimed is:

1. A method for colour component prediction, applicable for an encoder and comprising:
   determining prediction parameters of a current block, the prediction parameters comprising a prediction mode parameter and a size parameter of the current block;
   when the prediction mode parameter indicates that a Matrix-based Intra Prediction (MIP) mode is adopted to determine an intra prediction value of the current block, determining an MIP weight matrix of the current block, a shift factor of the current block and an MIP input sample matrix of the current block; and
   determining the intra prediction value of the current block according to the MIP weight matrix, the shift factor and the MIP input sample matrix,
   wherein the MIP weight matrix of the current block is at least determined according to a block size index value of the current block;
   the block size index value of the current block is determined according to the size parameter of the current block; and
   determining the block size index value of the current block according to the size parameter of the current block comprises:
      when both a width and a height of the current block are equal to 4, setting the block size index value of the current block equal to 0;
      when both the width and height of the current block are equal to 8 or only one of the width and height of the current block is equal to 4, setting the block size index value of the current block equal to 1; or
      when both the width and height of the current block do not meet the above conditions, setting the block size index value of the current block equal to 2.

2. The method of claim 1, wherein determining the intra prediction value of the current block according to the MIP weight matrix, the shift factor and the MIP input sample matrix comprises:
   performing matrix multiplication processing on the MIP input sample matrix, the MIP weight matrix and the shift factor by use of a preset calculation model to obtain an MIP-based prediction block of the current block; and
   performing filtering processing on the MIP-based prediction block to obtain the intra prediction value of the current block, the MIP-based prediction block comprising prediction values of at least part of pixel positions in the current block.

3. A method for colour component prediction, applicable for a decoder and comprising:
   parsing a bitstream to acquire prediction parameters of a current block, the prediction parameters comprising a prediction mode parameter and a size parameter of the current block;
   when the prediction mode parameter indicates that a Matrix-based Intra Prediction (MIP) mode is adopted to determine an intra prediction value of the current block, determining an MIP weight matrix of the current block, a shift factor of the current block and an MIP input sample matrix of the current block; and
   determining the intra prediction value of the current block according to the MIP weight matrix, the shift factor and the MIP input sample matrix,
   wherein the MIP weight matrix of the current block is determined at least according to a block size index value of the current block;
   the block size index value of the current block is determined according to the size parameter of the current block; and
   determining the block size index value of the current block according to the size parameter of the current block comprises:
      when both a width and a height of the current block are equal to 4, setting the block size index value of the current block equal to 0;
      when both the width and height of the current block are equal to 8 or only one of the width and height of the current block is equal to 4, setting the block size index value of the current block equal to 1; or
      when both the width and height of the current block do not meet the above conditions, setting the block size index value of the current block equal to 2.

4. The method of claim 3, wherein determining the intra prediction value of the current block according to the MIP weight matrix, the shift factor and the MIP input sample matrix comprises:
   performing matrix multiplication processing on the MIP input sample matrix, the MIP weight matrix and the shift factor by use of a preset calculation model to obtain an MIP-based prediction block of the current block; and
   performing filtering processing on the MIP-based prediction block to obtain the intra prediction value of the current block, the MIP-based prediction block comprising predicted values of at least part of pixel positions in the current block.

5. An encoder, comprising a memory and a processor, wherein
   the memory is configured to store computer programs capable of running in the processor; and
   the processor is configured to run the computer programs to:
   determine prediction parameters of a current block, the prediction parameters comprising a prediction mode parameter and a size parameter of the current block;
   when the prediction mode parameter indicates that a Matrix-based Intra Prediction (MIP) mode is adopted to determine an intra prediction value of the current block, determine an MIP weight matrix of the current block, a shift factor of the current block and an MIP input sample matrix of the current block; and
   determine the intra prediction value of the current block according to the MIP weight matrix, the shift factor and the MIP input sample matrix,
   wherein the MIP weight matrix of the current block is at least determined according to a block size index value of the current block;

the block size index value of the current block is determined according to the size parameter of the current block; and the processor is further configured to run the computer programs to:
set the block size index value of the current block equal to 0 when both a width and a height of the current block are equal to 4;
set the block size index value of the current block equal to 1 when both the width and height of the current block are equal to 8 or only one of the width and height of the current block is equal to 4; or
set the block size index value of the current block equal to 2 when both the width and height of the current block do not meet the above conditions.

6. The encoder of claim 5, wherein the processor is further configured to run the computer programs to:
perform matrix multiplication processing on the MIP input sample matrix, the MIP weight matrix and the shift factor by use of a preset calculation model to obtain an MIP-based prediction block of the current block; and
perform filtering processing on the MIP-based prediction block to obtain the intra prediction value of the current block, the MIP-based prediction block comprising prediction values of at least part of pixel positions in the current block.

7. A decoder, comprising a memory and a processor, wherein
the memory is configured to store computer programs capable of running in the processor; and
the processor is configured to run the computer programs to:
parse a bitstream to acquire prediction parameters of a current block, the prediction parameters comprising a prediction mode parameter and a size parameter of the current block;
when the prediction mode parameter indicates that a Matrix-based Intra Prediction (MIP) mode is adopted to determine an intra prediction value of the current block, determine an MIP weight matrix of the current block, a shift factor of the current block and an MIP input sample matrix of the current block; and
determine the intra prediction value of the current block according to the MIP weight matrix, the shift factor and the MIP input sample matrix,
wherein the MIP weight matrix of the current block is determined at least according to a block size index value of the current block;
the block size index value of the current block is determined according to the size parameter of the current block; and
the processor is further configured to run the computer programs to:
set the block size index value of the current block equal to 0 when both a width and a height of the current block are equal to 4;
set the block size index value of the current block equal to 1 when both the width and height of the current block are equal to 8 or only one of the width and height of the current block is equal to 4; or
set the block size index value of the current block equal to 2 when both the width and height of the current block do not meet the above conditions.

8. The decoder of claim 7, wherein the processor is further configured to run the computer programs to:
perform matrix multiplication processing on the MIP input sample matrix, the MIP weight matrix and the shift factor by use of a preset calculation model to obtain an MIP-based prediction block of the current block; and
perform filtering processing on the MIP-based prediction block to obtain the intra prediction value of the current block, the MIP-based prediction block comprising predicted values of at least part of pixel positions in the current block.

* * * * *